(12) United States Patent
Lu

(10) Patent No.: US 12,048,051 B2
(45) Date of Patent: Jul. 23, 2024

(54) METHOD AND APPARATUS FOR DATA TRANSMISSION, TERMINAL, AND STORAGE MEDIUM

(71) Applicant: GUANGDONG OPPO MOBILE TELECOMMUNICATIONS CORP., LTD., Dongguan (CN)

(72) Inventor: Qianxi Lu, Dongguan (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 358 days.

(21) Appl. No.: 17/563,959

(22) Filed: Dec. 28, 2021

(65) Prior Publication Data

US 2022/0151015 A1 May 12, 2022

Related U.S. Application Data

(63) Continuation of application No. PCT/CN2019/100279, filed on Aug. 12, 2019.

(51) Int. Cl.
*H04W 76/28* (2018.01)
*H04L 1/08* (2006.01)
*H04L 1/18* (2023.01)
*H04L 1/1812* (2023.01)
(Continued)

(52) U.S. Cl.
CPC .............. *H04W 76/28* (2018.02); *H04L 1/08* (2013.01); *H04L 1/1812* (2013.01); *H04W 72/1263* (2013.01)

(58) Field of Classification Search
CPC ......... H04W 72/1263; H04W 72/1268; H04W 72/1273; H04W 76/28; H04W 76/20; H04W 76/25; H04W 76/27; H04L 1/08; H04L 1/18; H04L 1/1858; H04L 1/189; H04L 1/12; H04L 1/1812; H04L 1/1809;
(Continued)

(56) References Cited

U.S. PATENT DOCUMENTS

2016/0242231 A1* 8/2016 Vajapeyam ........... H04W 24/08
2017/0339744 A1* 11/2017 Latheef ............. H04W 52/0235
2018/0145798 A1 5/2018 Suzuki et al.
(Continued)

FOREIGN PATENT DOCUMENTS

CN 101594637 A 12/2009
CN 107431581 A 12/2017
(Continued)

OTHER PUBLICATIONS

Guangdong OPPO Mobile Telecommunications Corp., Ltd., CN 201980094726.7, First Office Action, May 27, 2023, 12 pgs.
(Continued)

*Primary Examiner* — Phong La
(74) *Attorney, Agent, or Firm* — Morgan, Lewis & Bockius LLP

(57) ABSTRACT

The present disclosure relates to the field of wireless communication, and disclosed thereby are a method, apparatus, and system for data transmission. The method comprises: when discontinuous reception HARQ feedback is in a disabled state, starting up or restarting a discontinuous reception downlink retransmission timer in a downlink reception process. Thus, discontinuous reception is implemented after a HARQ mechanism in NTN technology is disabled.

8 Claims, 19 Drawing Sheets

(51) Int. Cl.
*H04W 72/12* (2023.01)
*H04W 72/1263* (2023.01)

(58) Field of Classification Search
CPC ... H04L 1/1816; H04L 1/1819; H04L 1/1822; H04L 1/1825; H04L 1/1829
See application file for complete search history.

(56) References Cited

U.S. PATENT DOCUMENTS

| | | | |
|---|---|---|---|
| 2018/0294927 A1 | 10/2018 | Takeda et al. | |
| 2020/0314948 A1* | 10/2020 | Babaei | H04L 1/1819 |
| 2022/0151015 A1* | 5/2022 | Lu | H04L 1/189 |

FOREIGN PATENT DOCUMENTS

| | | | | |
|---|---|---|---|---|
| CN | 107534895 A | | 1/2018 | |
| CN | 111757436 A | * | 10/2020 | H04L 1/1883 |
| EP | 3772197 A1 | * | 2/2021 | H04L 1/08 |
| EP | 3772197 A1 | | 2/2021 | |
| WO | WO-2019030726 A1 | * | 2/2019 | H04L 1/1819 |
| WO | WO2019137939 A1 | | 7/2019 | |
| WO | WO-2019192342 A1 | * | 10/2019 | H04L 1/1812 |
| WO | WO-2020032706 A1 | * | 2/2020 | H04L 5/0044 |
| WO | WO2021/026745 A1 | | 2/2021 | |

OTHER PUBLICATIONS

Guangdong OPPO Mobile Telecommunications Corp., Ltd., International Search Report and Written Opinion, PCT/CN2019/100279, Apr. 26, 2020, 11 pgs.

Thales, 105#52 (NR-NTN) TP on RAN2 agreements, 3GPP TSG-RAN WG2 Meeting #105bis, R2-1905297, revision of R2-1903279, Xi'An, China, Apr. 8-12, 2019, 11 pgs.

ZTE, Discussion on the HARQ procedure for NTN, 3GPP TSG RAN WG1 #97, R1-1906873, Reno, NV, USA, May 13-17, 2019, 4 pgs.

Guangdong OPPO Mobile Telecommunications Corp., Ltd., Extended European Search Report, EP19941518.3, May 20, 2022, 13 pgs.

Nomor Research GmbH, Considerations on MAC Control Loops and Timings in Non-Terrestrial Networks (NTN), 3GPP TSG-RAN WG2 Meeting #103-Bis, R2-1813615, Chengdu, China, Oct. 8-12, 2018, 6 pgs.

ZTE, Impact of HARQ on DRX, 3GPP TSG RAN WG2 Meeting #106, R2-1906117, Reno, USA, May 13-May 17, 2019, 7 pgs.

* cited by examiner

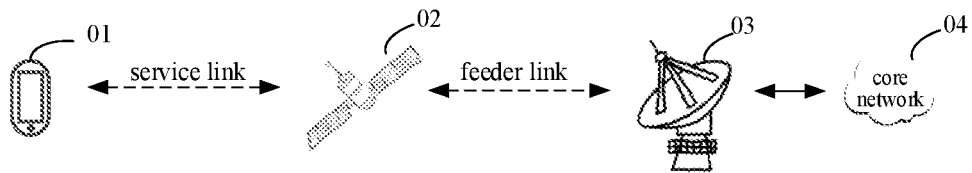
FIG. 1
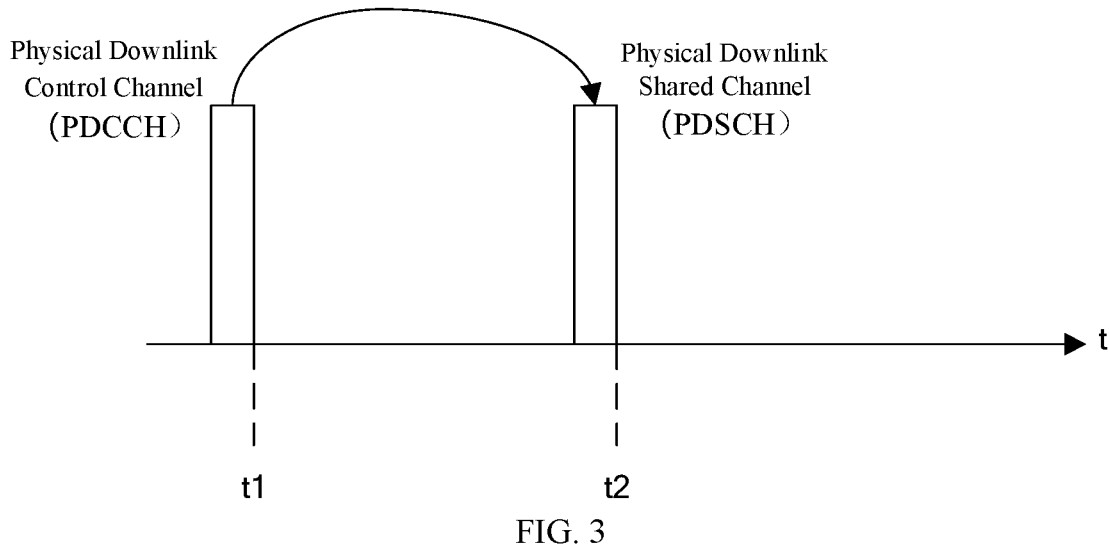
FIG. 2
FIG. 3
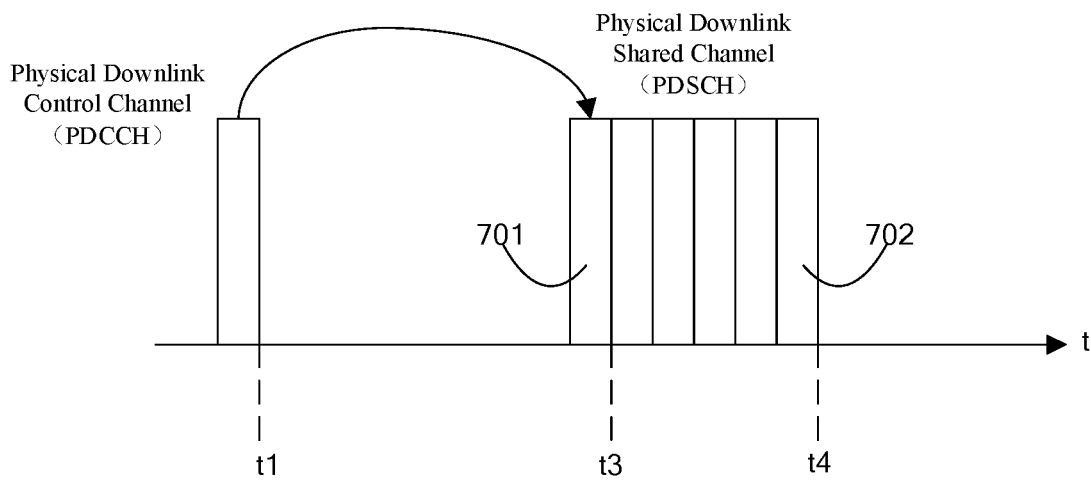
FIG. 4 manner 4 manner 5 manner 6 manner 7 manner 8 manner 9 manner 10

METHOD AND APPARATUS FOR DATA TRANSMISSION, TERMINAL, AND STORAGE MEDIUM

CROSS-REFERENCE TO RELATED APPLICATIONS

This application is a continuation application of PCT Patent Application No. PCT/CN2019/100279, entitled "METHOD AND APPARATUS FOR DATA TRANSMISSION, TERMINAL, AND STORAGE MEDIUM" filed on Aug. 12, 2019, the disclosure of which is incorporated herein by reference in its entirety.

TECHNICAL FIELD

The present disclosure relate to the field of wireless communication, and in particularly, to a method and apparatus for data transmission, a terminal and a storage medium.

BACKGROUND

Non-terrestrial network (NTN) technologies are technologies that use satellite communications to provide communications services to terrestrial users. Compared with terrestrial communications, there are many advantages. For example, the NTN technologies can provide services for areas which are difficult to be covered by the terrestrial communications, without user geographic restrictions. As another example, for the areas such as mountains, deserts, and oceans, the NTN technologies have lower communications costs than the terrestrial communications.

It is precisely because that the NTN technologies have many unique advantages, the Third Generation Partnership Project (3GPP) has begun to carry out research work on integration of the satellite communications and the terrestrial communications. In the integration process of the satellite communications and the terrestrial communications, functions or protocols of the fifth-generation mobile communications technology (5G) new radio (NR) applied to the terrestrial communications need to be adjusted appropriately so as to adapt to the NTN technologies. For example, in order to reduce a propagation delay of the NTN technologies, after a hybrid automatic repeat request (HARQ) mechanism is set to a disabled state, how to achieve discontinuous reception is a technical problem to be solved.

SUMMARY

Embodiments of the present disclosure provide a method and apparatus for data transmission, a terminal and a storage medium.

In one aspect, there is provided a method for data transmission, and the method includes:

starting or restarting a discontinuous reception downlink retransmission timer in a downlink reception process when a discontinuous reception HARQ feedback is in a disabled state.

In another aspect, there is provided an apparatus for data transmission, and the apparatus includes:

a starting module, configured to start or restart a discontinuous reception downlink retransmission timer in a downlink reception process when a discontinuous reception HARQ feedback is in a disabled state.

In another aspect, there is provided a terminal, including a processor and a memory, wherein the memory stores at least one instruction, and the at least one instruction is configured to be executed by the processor to carry out the method for data transmission in the above-mentioned aspect.

In another aspect, there is provided a computer-readable storage medium storing at least one instruction, wherein the at least one instruction is configured to be executed by a processor to carry out the method for data transmission in the above claims.

BRIEF DESCRIPTION OF THE DRAWINGS

In order to explain technical solutions in embodiments of the present disclosure more clearly, drawings needed in the description of these embodiments will be briefly introduced below. Obviously, the drawings in the following description are only some embodiments of the present disclosure. For those of ordinary skill in the art, other drawings can be obtained from these drawings without creative labor.

FIG. 1 is a schematic diagram of a communication system provided by an embodiment of the present disclosure;

FIG. 2 is a flowchart of a method for data transmission provided by an embodiment of the present disclosure;

FIG. 3 is a time-frequency schematic diagram of a method for data transmission provided by an exemplary embodiment of the present disclosure;

FIG. 4 is a time-frequency schematic diagram of a method for data transmission provided by an exemplary embodiment of the present disclosure;

DETAILED DESCRIPTION

Figure 5:
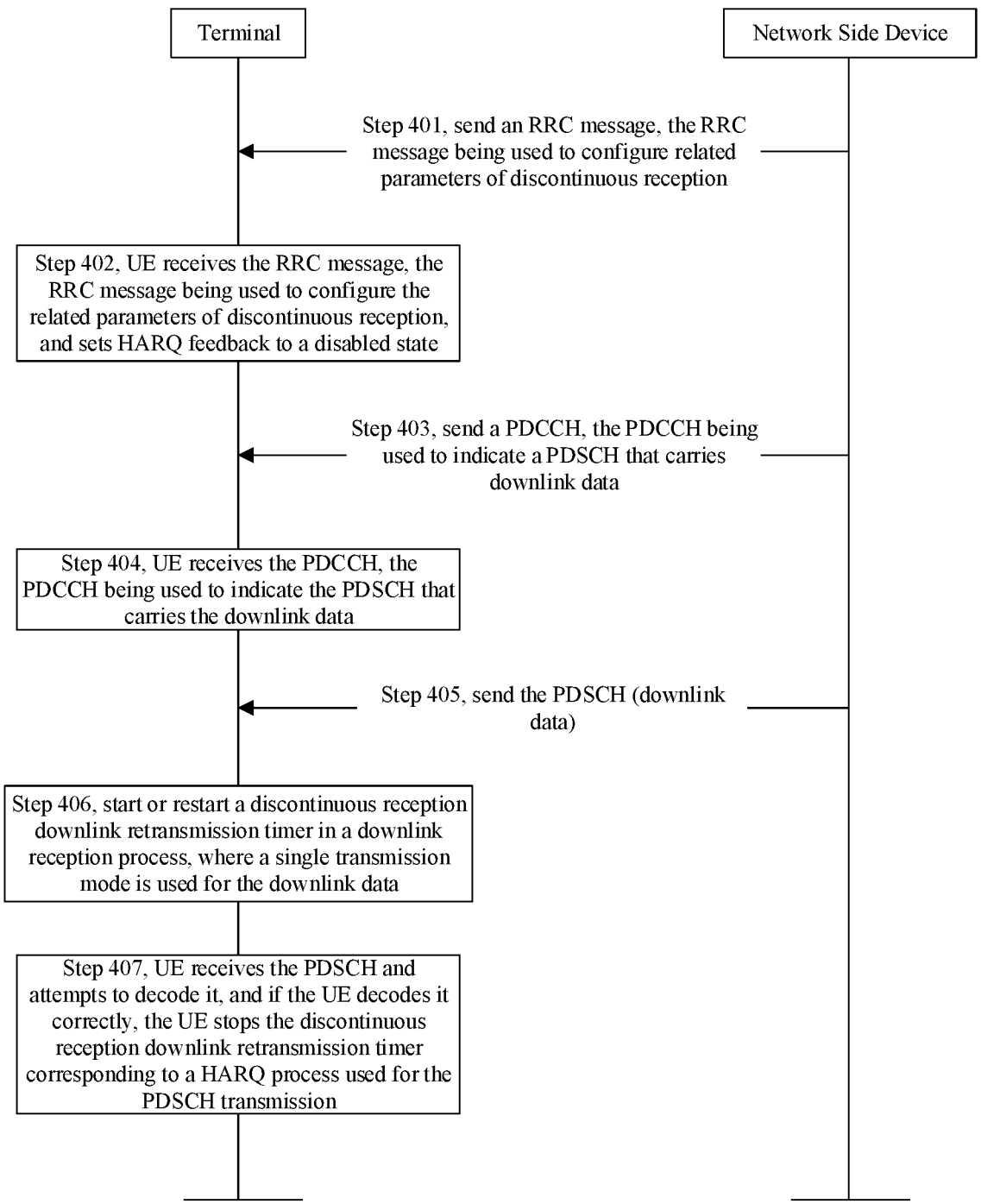
FIG. 5 is a flowchart of a method for data transmission provided by an exemplary embodiment of the present disclosure.

In order to make objectives, technical solutions, and advantages of the present disclosure clearer, implementations of the present disclosure will be further described in detail below with reference to the drawings.

At present, 3GPP is studying NTN technologies, which generally use satellite communications to provide communication services to terrestrial users. Compared with the terrestrial communications (such as terrestrial cellular networks), the satellite communications have many unique advantages. First of all, the satellite communications are not restricted by user geographical locations. For example, the typical terrestrial communications cannot cover areas where communication devices cannot be set up such as oceans, mountains, and deserts, or areas that are not covered with the communications due to sparse population. However, for the satellite communications, since one satellite can cover a large terrestrial area and the satellite can orbit round the earth, every corner on the earth can be covered by the satellite communications from a theoretical perspective. Secondly, the satellite communications have greater social value. Remote mountainous areas, poor and backward countries or regions can be covered by the satellite communications at a lower cost, so that people in these areas can enjoy advanced voice communications and mobile Internet technologies, which facilitates to narrow the digital divide between these areas and developed areas, and promotes the development of these areas. Thirdly, the satellite communications have a long communication distance, and the communication cost does not increase significantly as the communication distance increases. Finally, the satellite communications have a high stability, and are not affected by natural disasters.

Depending on orbital altitudes of communication satellites, the communication satellites can be classified into: low-earth orbit (LEO) satellites, medium-earth orbit (MEO) satellites, geostationary earth orbit (GEO) satellites, and high elliptical orbit (HEO) satellites, etc. At present, 3GPP mainly studies the LEO satellites and the GEO satellites. The orbital altitude of LEO satellites is in a range from 500 kilometers (km) to 1500 km, and the corresponding orbital period is about 1.5 hours to 2 hours. A signal propagation delay of single-hop communication between users is generally less than 20 milliseconds (ms), and the maximum satellite visible time is 20 minutes. The NTN technologies based on LEO satellites are characterized by short signal propagation distance, low link loss, and low requirements for transmission power of the user terminal. The GEO satellites have an orbital altitude of 35786 km, a rotation period around the earth of 24 hours, and a signal propagation delay of single-hop communication between users which is generally 250 ms. In order to ensure the coverage area of the satellite on the earth and increase a system capacity of the entire satellite communication system, the satellite uses multiple beams to cover the ground. That is, one satellite can form dozens or even hundreds of satellite beams to cover the ground, and each of the satellite beams can cover a ground area with a diameter of tens to hundreds of kilometers.

In an integration process of the satellite communications and the terrestrial communications, functions or protocols of the NR suitable for the terrestrial communications need to be adjusted appropriately so as to adapt to the NTN technologies. For example, a HARQ mechanism in the NR protocol suitable for the terrestrial communications needs to be adjusted, so as to adapt to the integration of the satellite communications and the terrestrial communications.

In order to help understand the relevant description of embodiments of the present disclosure, a discontinuous reception (DRX) mechanism in the NR protocol will be briefly introduced here first.

Data services are often bursty, and the transmission is occasionally active for a time period and will remain silent for a longer time period. From the perspective of delay, monitoring a downlink (DL) control instruction each slot (or even more frequently) is beneficial for receiving an uplink grant or downlink data and immediately responding to changes in service behaviors. But this also brings the cost of power consumption to the terminal. The power consumption of a typical terminal receiver circuit is considerable. In order to reduce the power consumption of the terminal, the NR standard introduces the DRX mechanism.

A basic mechanism for DRX is to configure a DRX cycle for the terminal. The terminal configured with the DRX cycle only monitors the downlink control instruction in an active state, and turns off the receiver circuit in the remaining time and enters a dormant state, which can significantly reduce the power consumption: the longer the DRX cycle, the lower the power consumption.

In the NR, the network configures a DRX function for the terminal, so that the terminal discontinuously monitors a physical downlink control channel (PDCCH) to save power for the terminal. Each medium access control (MAC) entity has a DRX configuration, and DRX configuration parameters include:

a discontinuous reception duration timer (drx-onDurationTimer); a delay before the discontinuous reception duration timer (drx-SlotOffset); a discontinuous reception inactivity timer (drx-InactivityTimer); a discontinuous reception downlink retransmission timer (drx-RetransmissionTimerDL); a discontinuous reception uplink retransmission timer (drx-RetransmissionTimerUL); a delay of start of a long discontinuous reception cycle (drx-LongCycleStartOffset); a short discontinuous reception cycle (drx-ShortCycle); a short discontinuous reception cycle timer (drx-ShortCycleTimer); a discontinuous reception hybrid automatic repeat request downlink round trip time timer (drx-HARQ-RTT-TimerDL); and a discontinuous reception hybrid automatic repeat request uplink round trip time timer (drx-HARQ-RTT-TimerUL).

After the terminal is configured with the DRX, it needs to monitor the PDCCH during a DRX active period. The DRX active period includes the following cases.

In a first case, any one of five timers of the drx-onDurationTimer, the drx-InactivityTimer, the drx-RetransmissionTimerDL, the drx-RetransmissionTimerUL and a random access contention resolution timer (ra-ContentionResolutionTimer) is running.

In a second case, a scheduling request (SR) is sent on the PUCCH and it is in a waiting state.

In a third case, in a contention-based random access procedure, the terminal has not received an initial transmission indicated by the PDCCH scrambled with a cell-radio network temporary identifier (C-RNTI) after successfully receiving a random access response.

The terminal determines a time to start the drx-onDurationTimer according to whether it is currently in the short DRX cycle or the long DRX cycle. The specific specifications are as follows: when the short DRX cycle is used, and the current subframe satisfies [(SFN×10)+subframe number] modulo (drx-ShortCycle)=(drx-StartOffset) modulo (drx-ShortCycle), then the drx-onDurationTimer is started; when the long DRX cycle is used, and the current subframe satisfies [(SFN×10)+subframe number] modulo (drx-LongCycle)=drx-StartOffset, then the drx-onDurationTimer is started; and the drx-onDurationTimer is started at a moment after a number of drx-SlotOffset slots from the beginning of the current subframe. SFN is the system frame number.

A condition for the terminal to start or restart the drx-InactivityTimer is: if the terminal receives a PDCCH indicating downlink or uplink initial transmission, the terminal starts or restarts the drx-InactivityTimer.

A condition for the terminal to start and stop the drx-RetransmissionTimerDL is: when the terminal receives a PDCCH indicating downlink transmission, or when the terminal receives a MAC protocol data unit (PDU) on a configured downlink grant resource, the terminal stops the drx-RetransmissionTimerDL corresponding to the HARQ process. After completing transmission of a HARQ process feedback for this downlink transmission, the terminal starts the drx-HARQ-RTT-TimerDL corresponding to the HARQ process. If the timer drx-HARQ-RTT-TimerDL corresponding to a certain HARQ of the terminal expires, and downlink data transmitted with this HARQ process is not successfully decoded, the terminal starts the drx-RetransmissionTimerDL corresponding to this HARQ process.

A condition for the terminal to start and stop the drx-RetransmissionTimerUL is:

when the terminal receives a PDCCH indicating uplink transmission, or when the terminal sends the MAC PDU on a configured uplink grant resource, the terminal stops the drx-RetransmissionTimerUL corresponding to the HARQ process. The terminal starts the drx-HARQ-RTT-TimerUL corresponding to the HARQ process after completing a first repetition of this PUSCH.

If the timer drx-HARQ-RTT-TimerUL corresponding to a certain HARQ of the terminal expires, the terminal starts the drx-RetransmissionTimerUL corresponding to this HARQ process.

It can be seen from the above DRX process that the terminal may first start a drx-HARQ-RTT-Timer (the drx-HARQ-RTT-TimerUL for the uplink transmission, and the drx-HARQ-RTT-TimerUL for the uplink transmission) after completing the uplink transmission or the HARQ process feedback for the downlink transmission. The terminal is in a dormant state during the operation of the drx-HARQ-RTT-Timer and does not monitor the PDCCH. After the timer expires, the terminal starts monitoring uplink retransmission scheduling or determines whether to start monitoring downlink retransmission scheduling according to the feedback. The drx-HARQ-RTT-TimerUL and the drx-HARQ-RTT-TimerDL are semi-statically configured by network radio resource control (RRC).

The HARQ mechanism is briefly introduced here.

The NR protocol defines two levels of retransmission mechanisms, namely a HARQ mechanism of a medium access control (MAC) layer, and an automatic repeat request (ARQ) mechanism of a radio link control (RLC) layer. The retransmission of lost or erroneous data is mainly handled by the HARQ mechanism of the MAC layer, and then supplemented by the retransmission function of the RLC layer. The HARQ mechanism of the MAC layer can provide quick data retransmission, and the ARQ mechanism of the RLC layer can provide reliable data transmission.

The HARQ mechanism uses a stop-and-wait protocol (also known as the SQW protocol) to send data. In the stop-and-wait protocol, after sending a transmission block (TB), a sender stops and waits for an acknowledgment. This process can also be called a HARQ feedback. In this way, the sender will stop and wait for confirmation after sending the TB each time, resulting in very low user throughput. Therefore, in order to improve the user throughput, the NR uses multiple parallel HARQ processes to send data blocks. When one HARQ process is waiting for the confirmation information, the sender can use another HARQ process to continue sending the data blocks. These HARQ processes together form one HARQ entity, and this HARQ entity combines the stop-and-wait protocol to allow continuously sending the data blocks. The multiple HARQ processes include uplink HARQ processes and downlink HARQ processes. The uplink HARQ processes and the downlink HARQ processes are independent of each other and do not affect each other. The number of uplink HARQ processes can be same as that of downlink HARQ processes. The uplink HARQ processes are for uplink data transmission, and the downlink HARQ processes are for downlink data transmission. The confirmation message includes an ACK and a NACK. If it is confirmed that the reception is successful, the confirmation message is the ACK. If it is confirmed that the reception fails, the confirmation message is the NACK. For ease of description, the TBs sent by the sender are also referred to as data below.

When each downlink HARQ process is used for downlink data transmission, a network side device (such as a base station) needs to allocate an appropriate time-frequency domain resource for the downlink transmission of the terminal before transmitting the downlink data to the terminal, and informs the terminal through a PDCCH carrying downlink control information (DCI, also known as downlink scheduling signaling). The DCI carried on the PDCCH includes a position of the allocated time-frequency domain resource, MCS, an ID of the used downlink HARQ process, and initial transmission (or retransmission) indication, etc. The terminal receives the downlink data using the indicated downlink HARQ process on the corresponding resource according to the received DCI indication, and decodes the data. If the decoding of the terminal is successful, it may feedback the ACK to the network side device. After receiving the ACK, the network side device can use the downlink HARQ process to continue scheduling new data for transmission. If the decoding of the terminal fails, it may feedback the NACK to the network side device. After receiving the NACK, the network side device determines whether to use the downlink HARQ to continue scheduling the data for retransmission or to discard the data and schedule new data for transmission. Before receiving the ACK or NACK feedback for a certain downlink HARQ process from the terminal, the network side device cannot use the downlink HARQ process for data transmission.

When each uplink HARQ process is used for uplink data transmission, before transmitting uplink data, the terminal needs to be allocated an appropriate time-frequency domain resource by the network side device for the uplink transmission of the terminal, and the terminal is informed through the PDCCH carrying the DCI. The PDCCH includes the position of the allocated time-frequency domain resource, the MCS, the ID of the used uplink HARQ process, and the initial transmission and retransmission indication, etc. Based on the received PDCCH indication, the terminal sends the uplink data using the indicated uplink HARQ process on the corresponding resource. After receiving the uplink data, the network side device decodes the uplink data. If the decoding of the network side device is successful, the network side device can use the uplink HARQ process to continue scheduling new transmission of data. If the decoding of the network side device fails, the network side device determines whether to use the uplink HARQ process to continue scheduling the data for retransmission or discard the data and schedule new data for transmission. Before receiving the uplink data transmitted from the terminal, the network side device will not schedule the terminal to use the uplink HARQ process for data transmission. Accordingly, before completing the uplink transmission using a certain uplink HARQ process, the terminal will not receive another DCI to instruct the terminal to use the same uplink HARQ process for uplink transmission.

It is specified in the NR protocol applicable to the terrestrial communications that each serving cell corresponding to the terminal has its own HARQ entity. Each HARQ entity is responsible for maintaining a set of parallel downlink HARQ processes and a set of parallel uplink HARQ processes. At present, each uplink carrier and each downlink carrier both support up to 16 HARQ processes. The base station can indicate the maximum number of HARQ processes to the terminal through the semi-persistent configuration of radio resource control (RRC) signaling according to a network deployment condition. If the network does not provide the corresponding configuration parameter, the default maximum number of HARQ processes supported by each downlink carrier is 8, and the maximum number of HARQ processes supported by each uplink carrier is always 16. Each HARQ process corresponds to one HARQ process number (identity or identification, ID). For the downlink transmission, a broadcast control channel (BCCH) uses a dedicated broadcast HARQ process. For the uplink transmission, the third message (Msg3) transmission in a random procedure uses HARQ ID 0.

For a terminal that does not support downlink spatial division multiplexing, each downlink HARQ process can only process one TB at a time. For a terminal that supports downlink spatial division multiplexing, each downlink HARQ process can process one TB or two TBs at a time. Each uplink HARQ process of the terminal processes one TB at a time. The HARQ mechanism can be classified into a synchronous HARQ mechanism and an asynchronous HARQ mechanism in the time domain, and into a non-adaptive HARQ mechanism and an adaptive HARQ mechanism in the frequency domain. The uplink and downlink transmissions in the NR protocol use an asynchronous adaptive HARQ mechanism. The asynchronous HARQ mechanism means that the retransmission of TB can occur at any time, and for the same TB, a time interval between its retransmission and the previous transmission is not fixed. The adaptive HARQ mechanism means that a frequency domain resource and modulation and coding scheme (MCS) used for the retransmission of TB can be changed.

Based on the above introduction, it can be seen that for the HARQ mechanism in the NR protocol suitable for the terrestrial communications, during the downlink transmission, the network side device needs to wait for the ACK or NACK with regard to the previous downlink HARQ process fed back by a receiving terminal, before it can continue to schedule this downlink HARQ process for downlink transmission; and during the uplink transmission, the network side device needs to wait until receiving uplink data transmitted based on a uplink HARQ process and completing the decoding, and then can continue scheduling the same uplink HARQ process for uplink transmission. This makes the propagation delay of data to be longer, especially for a case where a distance between the satellite and the ground is farther, causing the propagation delay of the NTN technologies to be more serious.

In addition, if the HARQ mechanism in the NR protocol suitable for the terrestrial communications is still used, although the multiple parallel HARQ processes can be used to send data, the longer the propagation delay, the more the HARQ processes that need to be set up and maintained in the communication devices (including the terminal and the network side device), and in a case of severe delay, in order to achieve continuous data transmission, the communication devices need to support a larger number of HARQ processes (of course, even if the maximum number of HARQ processes is supported, it may be difficult to alleviate the propagation delay). This not only requires further function expansion of the communication devices based on the existing functions, but also poses higher requirements on the communication devices, which increases the burden on the communication devices.

It should be noted that if the communication device turns on the HARQ feedback, that is, the HARQ feedback is in an available state, it can be said that the HARQ feedback of the communication device is in an enabled state (or an active state), and the communication device can return a feedback message (ACK or NACK) in this state. Correspondingly, if the communication device turns off the HARQ feedback, that is, the HARQ feedback is in an unavailable state, it can be said that the HARQ feedback of the communication device is in a disabled state (or an inactive state), and the communication device cannot return the feedback message (ACK or NACK) in this state. The communication device is a device capable of performing communication, such as a terminal (e.g., a user terminal), a base station, or a satellite.

At present, both the uplink and downlink in the NR support the HARQ mechanism. Therefore, the two timers drx-HARQ-RTT-TimerUL and drx-HARQ-RTT-TimerDL are used in the DRX process. These two parameters reflect the minimum time interval required by the UE from the uplink transmission to receiving retransmission scheduling sent by the network, that is, the time period of one RTT.

Compared with a cellular network used in the traditional NR, the signal propagation delay between the UE and the satellite in the NTN is significantly increased. In order to ensure the continuity of data transmission without increasing the number of HARQ processes, a scheme of turning on/off the HARQ is being discussed in the standardization process at present, and the following clear conclusions are formed. First, the network can configure whether to turn on the HARQ function or not. Second, if the HARQ function is turned off, the UE does not need to send the HARQ feedback for the PDSCH to the network. Third, in the case of turning off the HARQ feedback, in order to ensure the reliability of data transmission, the HARQ retransmission is still supported. Fourth, it is necessary to separately study the impact on other processes in the two cases where the HARQ is turned on and the HARQ is turned off.

The following analyzes possible impacts on the DRX process when the HARQ is turned off.

First, if the HARQ is turned off, since there is no feedback for the HARQ, the network can continue scheduling the retransmission of the uplink transmission or the downlink transmission before receiving the uplink transmission or the feedback for the downlink transmission from the UE. For the UE, and for the uplink data transmission, the UE can continue to receive the uplink retransmission scheduling after sending the current uplink transmission; and for the downlink data transmission, the UE can continue to receive the downlink retransmission scheduling before completing the decoding of the current downlink transmission. Therefore, in the case where the HARQ is turned off, the timers drx-HARQ-RTT-TimerUL and drx-HARQ-RTT-TimerDL may no longer be needed.

Secondly, for the discontinuous reception retransmission timer:

for the uplink data transmission, based on the present DRX process, if the UE receives the PDCCH indicating the uplink transmission, or if the UE sends the MAC PDU on the configured uplink grant resource, the UE stops the drx-RetransmissionTimerUL corresponding to the HARQ process. The UE starts the drx-HARQ-RTT-TimerUL corresponding to the HARQ process after completing the first repetition transmission of the PUSCH. When the timer drx-HARQ-RTT-TimerUL expires, the UE starts the drx-RetransmissionTimerUL corresponding to the HARQ process again. In the case where the HARQ is turned off, the traditional DRX process can be used directly, and it only needs to configure the timer drx-HARQ-RTT-TimerUL as 0, which is equivalent to that the UE starts the drx-HARQ-RTT-TimerUL corresponding to the HARQ process after completing the first repetition transmission of the PUSCH.

For the downlink data transmission, based on the present DRX process, if the UE receives the PDCCH indicating the downlink transmission, or if the UE receives the MAC PDU on the configured downlink grant resource, the UE stops the drx-RetransmissionTimerDL corresponding to the HARQ process. The UE starts the drx-HARQ-RTT-TimerDL corresponding to the HARQ process after completing the transmission of the HARQ process feedback for this downlink transmission. When the timer drx-HARQ-RTT-TimerDL expires and the decoding of the downlink data by the UE is not successful, the UE starts the drx-RetransmissionTimerDL corresponding to the HARQ process again. In the case of turning off the HARQ, since the UE no longer sends the HARQ feedback for the downlink transmission, it is necessary to re-define when to start the drx-RetransmissionTimerDL corresponding to the HARQ process.

From the above analysis, it can be seen that when the HARQ is turned off, the main impact on the DRX process lies in the following.

For the uplink transmission, the timer drx-HARQ-RTT-TimerUL can be directly configured to 0, and other processes are not affected.

For the downlink transmission, the drx-HARQ-RTT-TimerDL is no longer needed, and in addition, a starting time of the drx-RetransmissionTimerDL needs to be redefined.

For the downlink transmission, the present disclosure provides a method for starting or restarting a discontinuous reception downlink retransmission timer in a downlink reception process when a discontinuous reception HARQ feedback is in a disabled state.

FIG. 1 shows a schematic diagram of a communication system provided by an embodiment of the present disclosure. The communication system describes a satellite access network in the NTN technologies. The communication system includes a terminal 01, a satellite 02, a gateway 03, and a core network 04.

In the NTN technologies, there may be multiple terminals 01, and the multiple terminals 01 may all be in communication connection with the satellite 02. FIG. 1 schematically shows only one terminal 01. In addition, there may be multiple satellites 02, and the multiple satellites 02 are connected through inter satellite/aerial links (ISL). FIG. 1 schematically shows only one satellite 02.

In the NTN technologies, the terminal can also be called an NTN terminal, and the NTN terminal can be a terminal defined by 3GPP. Alternatively, when the satellite does not directly serve the terminal defined by 3GPP, the NTN terminal can be a terminal specific to a satellite system. The terminal may be user equipment (UE).

The terminal 01 and the satellite 02 are communicatively connected via a service link, and the service link refers to a radio link between the terminal 01 and the satellite 02. In addition, the terminal 01 can also support a wireless communication connection with a terrestrial access network.

The satellite 02 can also be called space platform or airborne platform (space/airborne platform), which can realize bent pipe or regenerative payload configuration.

The gateway 03 is configured to connect the satellite (or aviation access network) 02 and the core network. The gateway 03 and the satellite 02 are connected by feeder links.

In the communication system provided by an embodiment of the present disclosure, the satellite 02 is configured to connect the terminal 01 to the core network 04. Note that, other optional communication systems may also include a base station, which is not limited in the embodiments of the present disclosure.

FIG. 2 shows a flowchart of a method for data transmission provided by an embodiment of the present disclosure. The method can be applied to a receiving end of a wireless signal, and the receiving end may be the terminal 01 in the communication system shown in FIG. 1, and the method includes the following.

In step 201, when a discontinuous reception HARQ feedback is in a disabled state, a discontinuous reception downlink retransmission timer is started or restarted in a downlink reception process.

Exemplarily, the terminal starts or restarts the discontinuous reception downlink retransmission timer at a certain time point related to the reception of downlink data in the downlink reception process. Exemplarily, when successfully decoding the downlink data, the terminal stops the discontinuous reception downlink retransmission timer; and when decoding of the downlink data fails, the terminal continues to run the discontinuous reception downlink retransmission timer (until the timer expires or a retransmission scheduling of the downlink data is received).

In summary, in the method for data transmission, by starting or restarting the discontinuous reception downlink retransmission timer in the downlink reception process, discontinuous reception of the data is achieved when the discontinuous reception HARQ feedback is in the disabled state.

Exemplarily, in the embodiment shown in FIG. 2, the certain time point related to the reception of downlink data in the downlink reception process may be: a first symbol after the downlink data is received.

Exemplarily, as shown in FIG. 3, the network side device (sender) first sends a physical downlink control channel (PDCCH) to the terminal, and the PDCCH carries downlink control information (DCI). The DCI is used to schedule a physical downlink shared channel (PDSCH) that carries the downlink data. After receiving the PDCCH, the terminal receives the downlink data carried in the PDSCH according to the scheduling of the DCI. In FIG. 3, it is assumed that the time when the scheduling information (that is, the DCI in the PDCCH) of the downlink data is received is t1, and the time at the first symbol after the downlink data is received is t2.

The terminal starts or restarts the discontinuous reception downlink retransmission timer corresponding to the HARQ process used for the downlink data at the first symbol after receiving the downlink data. Exemplarily, the terminal starts or restarts the discontinuous reception downlink retransmission timer corresponding to the HARQ process used for the downlink data at time t2.

In some embodiments, when a repeated transmission mode is used for the downlink data, the network side device may simultaneously send multiple repeated transmissions (or called data copies) of the downlink data. Exemplarily, as shown in FIG. 4, the network side device (sender) first sends the PDCCH to the terminal, the PDCCH carries the DCI, and the DCI is used to schedule the physical downlink shared channel (PDSCH) that carries the downlink data. After receiving the PDCCH, the terminal receives the downlink data carried in the PDSCH according to the scheduling of the DCI. The downlink data may be transmitted on the PDSCH in the repeated transmission mode for 6 repetitions (data copies). In FIG. 4, it is assumed that the time when the UE receives the scheduling information of the downlink data is t1, and the time at the first symbol after the UE receives the first repetition transmission 701 of the downlink data is t3, and the time at the first symbol after the UE receives the last repetition transmission 702 of the downlink data is t4.

In this case, "the first symbol after receiving the downlink data" includes at least two cases:

in a first case: a first symbol after the first repetition transmission of the downlink data; and in a second case: a first symbol after the last repetition transmission of the downlink data.

Correspondingly, the exemplary method for data transmission provided by the present disclosure includes the following.

Manner 1: the discontinuous reception downlink retransmission timer corresponding to the HARQ process used for the downlink data is started or restarted at the first symbol after the first repetition transmission of the downlink data is received. Exemplarily, the discontinuous reception downlink retransmission timer corresponding to the HARQ process used for the downlink data is started or restarted at time t3.

Manner 2: the discontinuous reception downlink retransmission timer corresponding to the HARQ process used for the downlink data is started or restarted at the first symbol after the last repetition transmission of the downlink data is received. Exemplarily, the discontinuous reception downlink retransmission timer corresponding to the HARQ process used for the downlink data is started or restarted at time t4.

In some other embodiments, when the repeated transmission mode is used for the downlink data, starting or restarting the discontinuous reception downlink retransmission timer corresponding to the HARQ process used for the downlink data at the first symbol after the downlink data is received can be implemented as following.

Manner 3: the discontinuous reception downlink retransmission timer corresponding to the HARQ process used for the downlink data is stopped at the first symbol after the first repetition transmission of the downlink data is received; and the discontinuous reception downlink retransmission timer corresponding to the HARQ process used for the downlink data is started at the first symbol after the last repetition transmission of the downlink data is received. Exemplarily, as shown in FIG. 4, the discontinuous reception downlink retransmission timer corresponding to the HARQ process used for the downlink data is stopped at time t3; and the discontinuous reception downlink retransmission timer corresponding to the HARQ process used for the downlink data is started at time t4.

Based on any one of the above three manners, a dynamic scheduling mode may be used for the downlink data, or a semi-persistent scheduling mode may be used for the downlink data.

In some other embodiments, when the scheduling mode of dynamic scheduling is used for the downlink data, the above method further includes:

stopping the discontinuous reception downlink retransmission timer corresponding to the downlink HARQ process used for the downlink data at a time when the scheduling information of the downlink data is received.

Exemplarily, the discontinuous reception downlink retransmission timer corresponding to the downlink HARQ process used for the downlink data is stopped at time t1, and then the discontinuous reception downlink retransmission timer corresponding to the downlink HARQ process used for the downlink data is started at at least one of time t2, time t3, and time t4.

In some other embodiments, the scheduling mode of dynamic scheduling is used for the downlink data, as another possible implementation. In the embodiment shown in FIG. 2, the discontinuous reception downlink retransmission timer corresponding to the downlink HARQ process used for the downlink data is started or restarted at the time when the scheduling information of the downlink data is received. Exemplarily, the discontinuous reception downlink retransmission timer corresponding to the downlink HARQ process used for the downlink data is started or restarted at time t1.

In some other embodiments, any one of the above-mentioned exemplary methods for data transmission provided by the present disclosure is applied to each of the initially transmitted downlink data and the retransmitted downlink data. In some other embodiments, any of the above-mentioned exemplary methods for data transmission provided by the present disclosure is applied to the initially transmitted downlink data. In some other embodiments, the exemplary method for data transmission provided by the present disclosure further includes that the discontinuous reception downlink HARQ round trip transmission time timer is not started when the discontinuous reception HARQ feedback is in the disabled state. In some other embodiments, the exemplary method for data transmission provided by the present disclosure further includes stopping the discontinuous reception downlink retransmission timer when the downlink data is successfully decoded.

In summary, in the method for data transmission provided by the embodiments of the present disclosure, by starting or restarting the discontinuous reception downlink retransmission timer in the downlink reception process, discontinuous reception of the data is achieved when the discontinuous reception HARQ feedback is in the disabled state.

In the embodiments of the present application, at least the following four situations are provided:

in a first situation: the downlink data dynamically scheduled and a single transmission mode is used for the downlink data;

in a second situation: the downlink data is dynamically scheduled and a repeated transmission mode is used for the downlink data;

in a third situation: the downlink data is semi-persistently scheduled and the single transmission mode is used for the downlink data; and in a fourth situation: the downlink data is semi-persistently scheduled and the repeated transmission mode is used for the downlink data.

These four situations will be explained separately hereinafter in the above order.

Regarding the first situation, the downlink data is dynamically scheduled and the single transmission mode is used for the downlink data.

Exemplarily, FIG. 3 schematically illustrates a transmission process of the downlink data that is dynamically scheduled and for which the single transmission mode is used. As shown in FIG. 3, it is assumed that the time when the scheduling information (that is, the DCI in the PDCCH) of the downlink data is received is t1, and the time at the first symbol after the downlink data is received is t2.

Exemplarily, the manner of starting or restarting the discontinuous reception downlink retransmission timer in the downlink reception process includes at least the following three manners.

Manner 1: the discontinuous reception downlink retransmission timer corresponding to the downlink HARQ process used for the downlink data is started or restarted at the time when the scheduling information of the downlink data is received.

Manner 2: the discontinuous reception downlink retransmission timer corresponding to the downlink HARQ process used for the downlink data is stopped at the time when the scheduling information of the downlink data is received; and the discontinuous reception downlink retransmission timer corresponding to the downlink HARQ process used for the downlink data is started at the first symbol after the downlink data is received.

Manner 3: the discontinuous reception downlink retransmission timer corresponding to the downlink HARQ process used for the downlink data is started or restarted at the first symbol after the downlink data is received.

Figure 6:
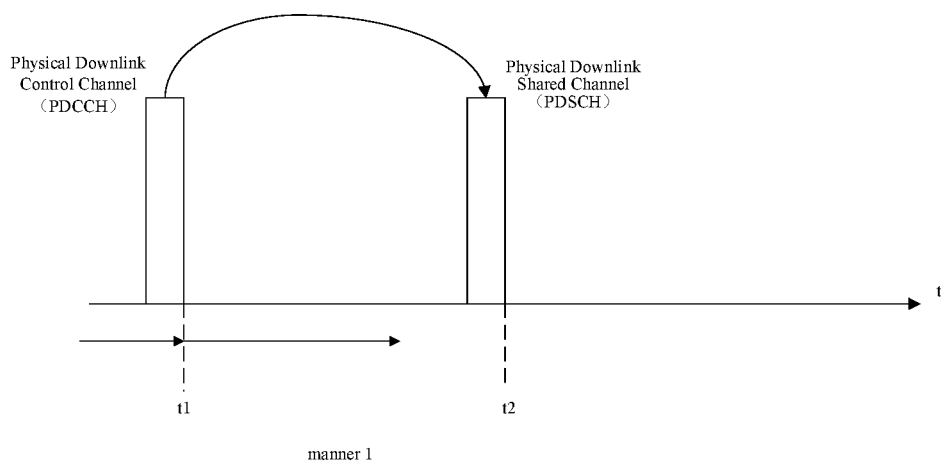
FIG. 6 is a time-frequency schematic diagram of a method for data transmission provided by an exemplary embodiment of the present disclosure when being implemented.
Figure 6:
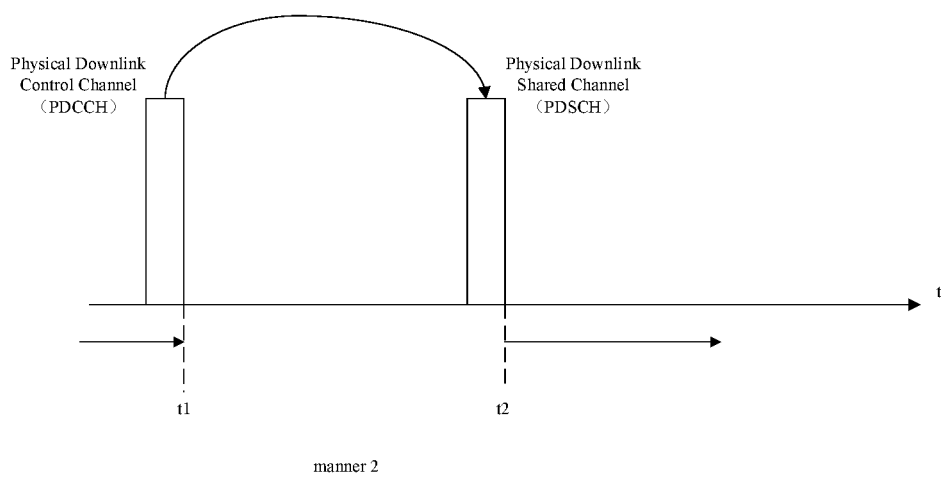
Figure 6:
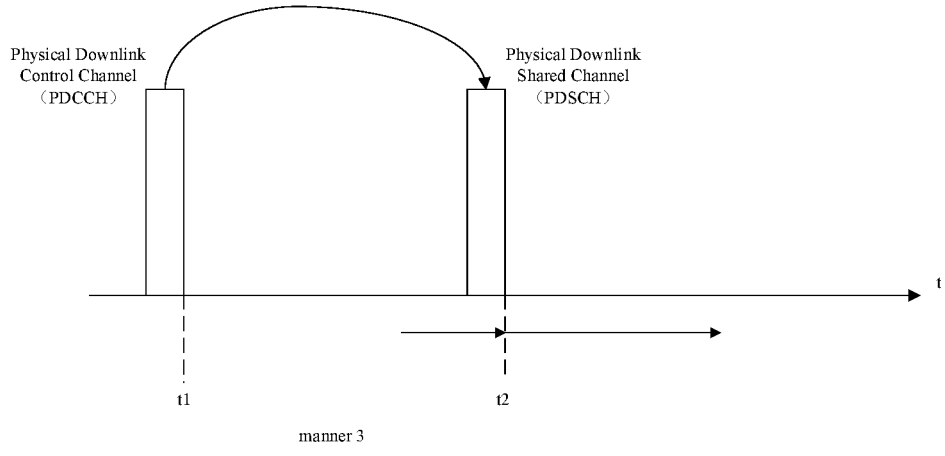

The manner 1 is taken as example and is described in conjunction with FIG. 5 and FIG. 6. FIG. 5 is a flowchart of a method for data transmission provided by an exemplary embodiment of the present disclosure, and FIG. 6 is a time-frequency schematic diagram of a method for data transmission provided by the embodiment shown in FIG. 5 when being implemented. The method includes at least the following steps.

In step 401, the network side device sends an RRC message, where the RRC message is used to configure related parameters of discontinuous reception.

The related parameters of the discontinuous reception include timer parameters, such as a discontinuous reception cycle (DRX cycle), a discontinuous reception duration timer (drx-onDurationTimer), a discontinuous reception inactivity timer (drx-InactivityTimer), and a discontinuous reception downlink retransmission timer (drx-RetransmissionTimerDL), etc. In some embodiments, the RRC message is also used to indicate to set the HARQ feedback to the disabled state.

In step 402, the UE receives the RRC message, the RRC message being used to configure the related parameters of the discontinuous reception, and sets the HARQ feedback to the disabled state.

The UE sets the related parameters of the discontinuous reception according to the RRC message, and sets the HARQ feedback to the disabled state. It should be noted that the network side device may send separate higher layer signaling to the UE, and the higher layer signaling is used to indicate to set the HARQ feedback to the disabled state. The higher layer signaling and the RRC message used to configure the DRX parameter are sent at the same time or different times.

In step 403, the network side device sends a PDCCH to the UE, where the PDCCH is used to indicate a PDSCH that carries the downlink data.

Exemplarily, the network side device sends the PDCCH to the UE, the PDCCH carries DCI, and the DCI is used to schedule the PDSCH that carries the downlink data (that is, used to indicate a time-frequency resource position for transmitting the downlink data). The DCI can be regarded as the scheduling information of the downlink data.

In step 404, the UE receives the PDCCH, where the PDCCH is used to indicate the PDSCH that carries the downlink data.

The UE receives the PDCCH at time t1, and gets the time-frequency resource position of the downlink data according to the DCI in the PDCCH.

In step 405, the network side device sends the PDSCH to the UE, where the PDSCH carries a downlink transmission that adopts a single transmission mode.

The single transmission mode is relative to a repeated transmission mode. The single transmission mode only transmits one copy of the downlink data, and the repeated transmission mode transmits multiple identical copies of the downlink data.

In step 406, the UE starts or restarts the discontinuous reception downlink retransmission timer in the downlink reception process, where the single transmission mode is used for the downlink data.

The discontinuous reception downlink retransmission timer corresponding to the downlink HARQ process used for the downlink data is started or restarted at the time t1 when the scheduling information (DCI in the PDCCH) of the downlink data is received, as shown by the manner 1 in FIG. 6. That is, the discontinuous reception downlink retransmission timer corresponding to the downlink HARQ process used for the downlink data is started or restarted at the time t1. A duration of the discontinuous reception downlink retransmission timer is configured by the RRC message in the step 401.

In step 407, the UE receives the PDSCH and attempts to decode it. If the UE decodes it correctly, the UE stops the discontinuous reception downlink retransmission timer corresponding to the HARQ process used for the PDSCH transmission.

Exemplarily, when the downlink data is successfully decoded, the terminal stops the discontinuous reception downlink retransmission timer; when decoding of the downlink data fails, the terminal continues to run the discontinuous reception downlink retransmission timer (until the timer expires or the terminal receives a retransmission scheduling of the downlink data). If decoding by the UE fails, the UE can monitor the PDCCH during the duration of the discontinuous reception downlink retransmission timer, and expect to receive the retransmission scheduling actively initiated by the network side device (not triggered by NACK). The manner 2 and the manner 3 are similar to the manner 1. When the manner 2 or the manner 3 is used to start the discontinuous reception downlink retransmission timer in the step 406, the time-frequency diagrams in implementation are shown by the manner 2 and the manner 3 in FIG. 6. Exemplary, for the manner 2, the UE stops the discontinuous reception downlink retransmission timer corresponding to the downlink HARQ process used for the downlink data at the time t1, and starts the discontinuous reception downlink retransmission timer corresponding to the downlink HARQ process used for the downlink data at the time t2. For the manner 3, the UE starts or restarts the discontinuous reception downlink retransmission timer corresponding to the downlink HARQ process used for the downlink data at the time t2. That is, at the time t1, the UE does not need to perform additional operations on the discontinuous reception downlink retransmission timer.

In summary, in the method for data transmission provided by the embodiments of the present disclosure, when the downlink data is dynamically scheduled downlink data, the discontinuous reception of data is realized when the discontinuous reception HARQ feedback is in the disabled state by starting or restarting the discontinuous reception downlink retransmission timer corresponding to the downlink HARQ process used for the downlink data at the time when the scheduling information of the downlink data is received or at the first symbol after the downlink data is received.

The discontinuous reception downlink retransmission timer corresponding to the downlink HARQ process used for the downlink data is stopped at the time when the scheduling information of the downlink data is received, and the discontinuous reception downlink retransmission timer corresponding to the downlink HARQ process used for the downlink data is started at the first symbol after the downlink data is received. Since there is a high probability that the network side device will not perform retransmission scheduling between the time t1 and the time t2, stopping the discontinuous reception downlink retransmission timer (not monitoring the PDCCH) during this period can reduce the UE's monitoring time on the PDCCH, which facilitates the UE to save power and increase battery life.

Regarding the Second Situation, the Downlink Data is Dynamically Scheduled and the Repeated Transmission Mode is Used for the Downlink Data.

Exemplarily, FIG. 4 schematically illustrates a transmission process of the downlink data that is dynamically scheduled and for which the repeated transmission mode is used. As shown in FIG. 4, the network side device (sender) first sends the PDCCH to the terminal, the PDCCH carries the DCI, and the DCI is used to schedule the physical downlink shared channel (PDSCH) that carries the downlink data. After receiving the PDCCH, the terminal receives the downlink data carried in the PDSCH according to the scheduling of the DCI. The downlink data may be transmitted on the PDSCH in the repeated transmission mode for 6 repetitions (data copies). In FIG. 4, it is assumed that the time when the UE receives the scheduling information of the downlink data is t1, the time at the first time after the first repeated transmission 701 of the downlink data is received is t3, and the time at the first symbol after the last repeated transmission 702 of downlink data is received is t4.

Exemplarily, the manner of starting or restarting the discontinuous reception downlink retransmission timer in the downlink reception process includes at least the following six manners.

Manner 4: the discontinuous reception downlink retransmission timer corresponding to the downlink HARQ process used for the downlink data is started or restarted at the time when the scheduling information of the downlink data is received.

Manner 5: the discontinuous reception downlink retransmission timer corresponding to the downlink HARQ process used for the downlink data is stopped at the time when the scheduling information of the downlink data is received; and the discontinuous reception downlink retransmission timer corresponding to the downlink HARQ process used for the downlink data is started at the first symbol after the first repeated transmission of the downlink data is received.

Manner 6: the discontinuous reception downlink retransmission timer corresponding to the downlink HARQ process used for the downlink data is stopped at the time when the scheduling information of the downlink data is received; and the discontinuous reception downlink retransmission timer corresponding to the downlink HARQ process used for the downlink data is started at the first symbol after the last repeated transmission of the downlink data is received.

Manner 7: the discontinuous reception downlink retransmission timer corresponding to the downlink HARQ process used for the downlink data is started or restarted at the first symbol after the first repeated transmission of the downlink data is received.

Manner 8: the discontinuous reception downlink retransmission timer corresponding to the downlink HARQ process used for the downlink data is started or restarted at the first symbol after the last repeated transmission of the downlink data is received.

Manner 9: the discontinuous reception downlink retransmission timer corresponding to the downlink HARQ process used for the downlink data is stopped at the first symbol after the first repeated transmission of the downlink data is received; and the discontinuous reception downlink retransmission timer corresponding to the downlink HARQ process used for the downlink data is started at the first symbol after the last repeated transmission of the downlink data is received.

Figure 7:
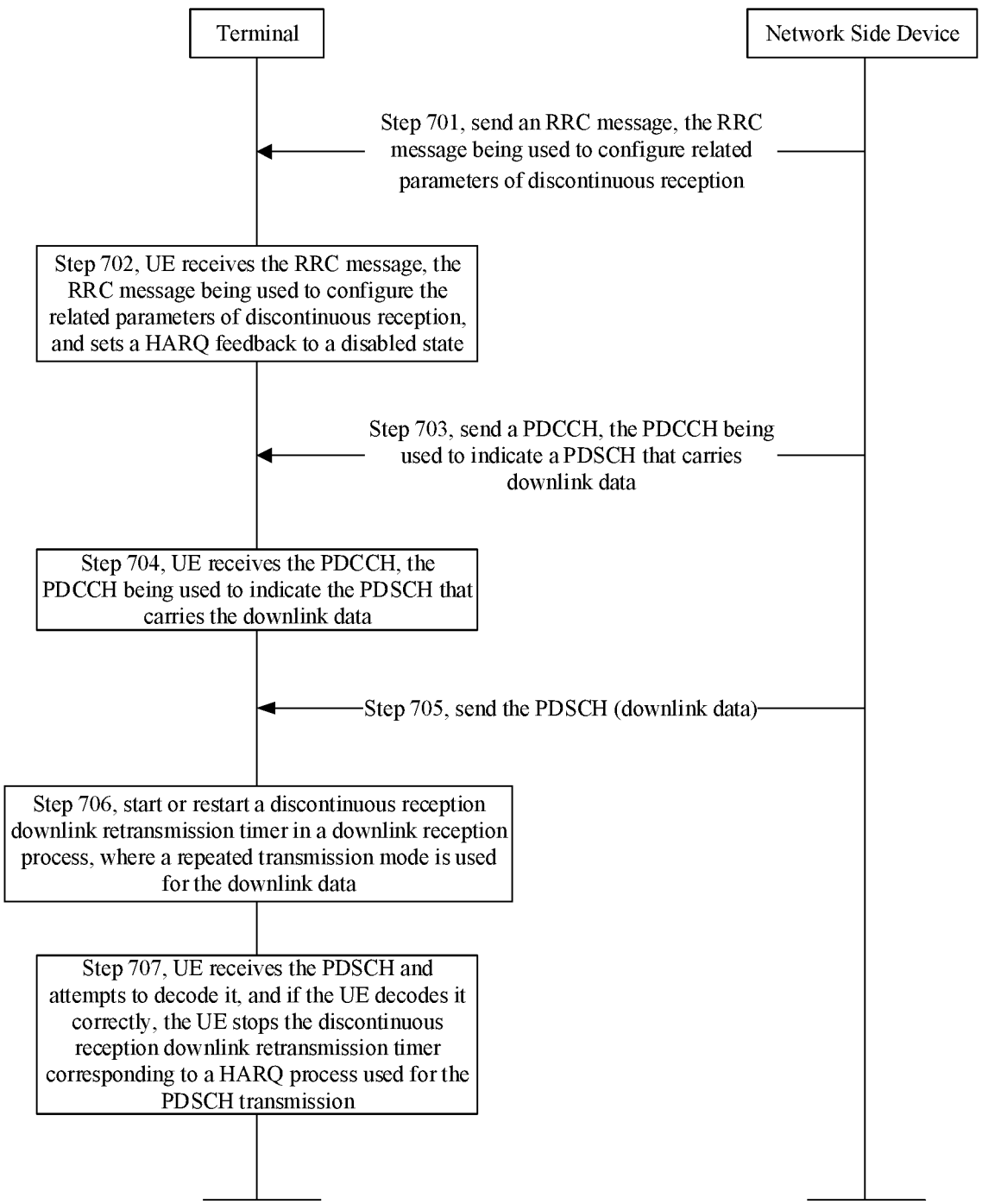
FIG. 7 is a flowchart of a method for data transmission provided by an exemplary embodiment of the present disclosure.
Figure 8:
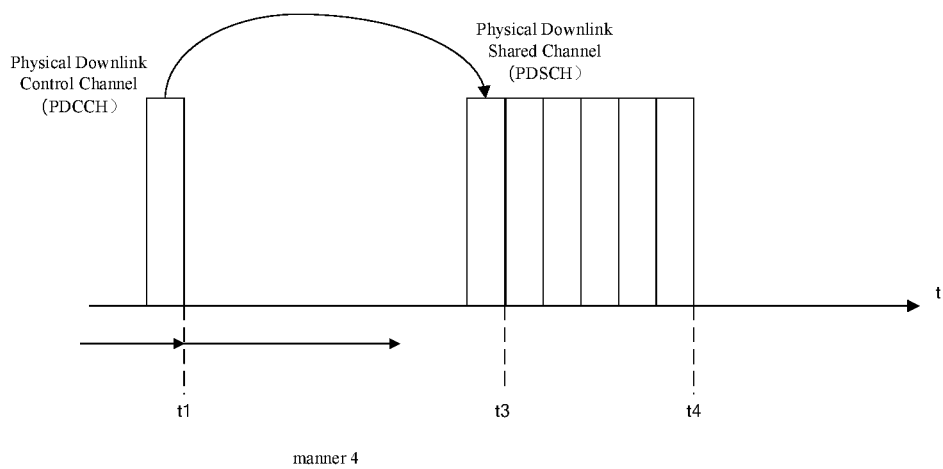
FIG. 8 is a time-frequency schematic diagram of a method for data transmission provided by an exemplary embodiment of the present disclosure when being implemented.
Figure 8:
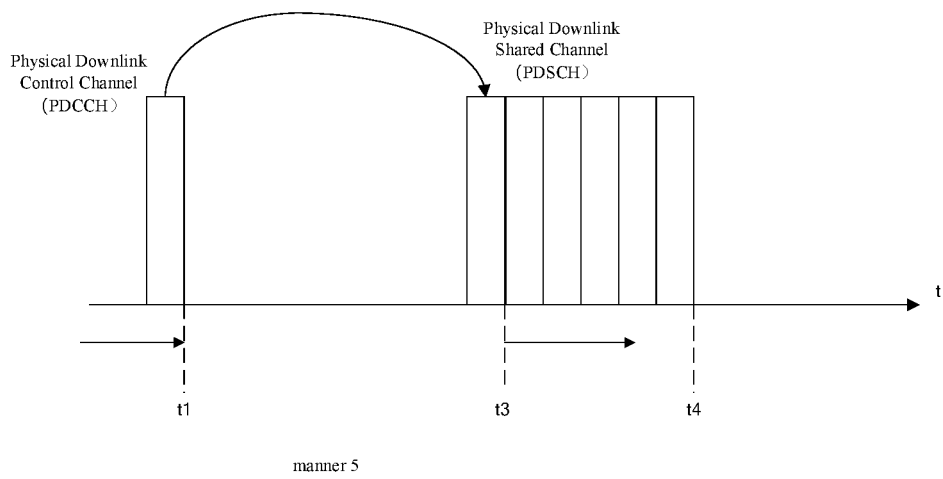
Figure 8:
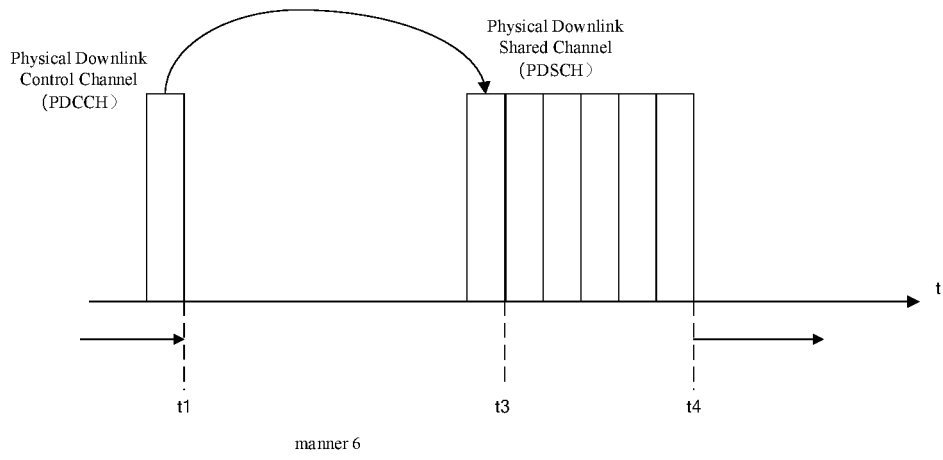

The manner 4 is taken as example and is described in conjunction with FIG. 7 and FIG. 8. FIG. 7 is a flowchart of a method for data transmission provided by an exemplary embodiment of the present disclosure, and FIG. 8 is a time-frequency schematic diagram of the method for data transmission provided by the embodiment shown in FIG. 7 when being implemented. The method includes at least the following steps.

In step 701, the network side device sends an RRC message, where the RRC message is used to configure related parameters of discontinuous reception.

The related parameters of discontinuous reception include: a DRX cycle, a drx-onDurationTimer, a drx-InactivityTimer, a drx-RetransmissionTimerDL, etc.

In step 702, the UE receives the RRC message, the RRC message being used to configure the related parameters of discontinuous reception, and sets the HARQ feedback to the disabled state.

In step 703, the network side device sends the PDCCH, where the PDCCH is used to indicate the PDSCH that carries the downlink data.

Exemplarily, the network side device sends the PDCCH to the UE, the PDCCH carries DCI, and the DCI is used to indicate the PDSCH that carries the downlink data (that is, used to indicate a time-frequency resource position for transmitting the downlink data). The DCI can be regarded as the scheduling information of the downlink data.

In step 704, the UE receives the PDCCH, where the PDCCH is used to indicate the PDSCH that carries the downlink data.

In step 705, the network side device sends the PDSCH, where the PDSCH carries the downlink data for which the repeated transmission mode is used.

In step 706, the discontinuous reception downlink retransmission timer is started or restarted in the downlink reception process, where the repeated transmission mode is used for the downlink data.

The discontinuous reception downlink retransmission timer corresponding to the downlink HARQ process used for the downlink data is started or restarted at the time when the scheduling information (DCI) of the downlink data is received, as shown by the manner 4 in FIG. 8.

That is, the discontinuous reception downlink retransmission timer corresponding to the downlink HARQ process used for the downlink data is started or restarted at time t1.

In step 707, the UE receives the PDSCH and attempts to decode it. If the UE decodes it correctly, the UE stops the discontinuous reception downlink retransmission timer corresponding to the HARQ process used for the PDSCH transmission.

Exemplarily, when the downlink data is successfully decoded, the terminal stops the discontinuous reception downlink retransmission timer; when the decoding of the downlink data fails, the terminal continues to run the discontinuous reception downlink retransmission timer (until the timer expires or the terminal receives a retransmission scheduling of the downlink data).

Figure 9:
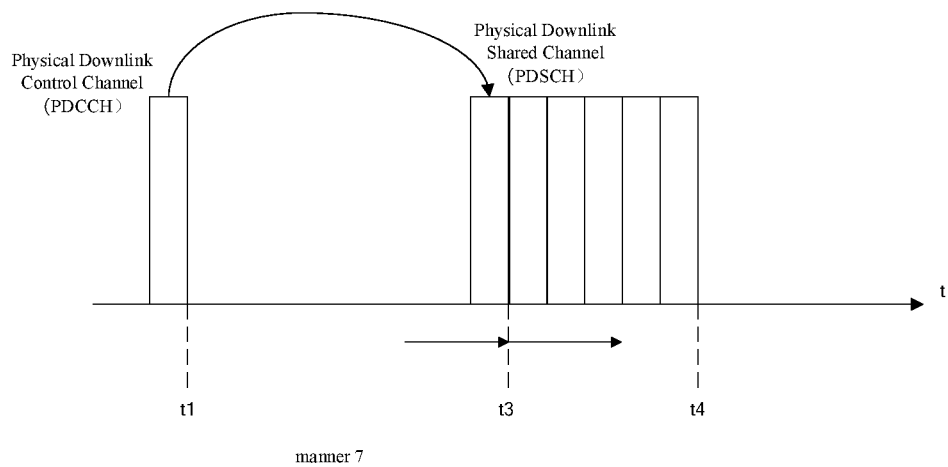
FIG. 9 is a time-frequency schematic diagram of a method for data transmission provided by an exemplary embodiment of the present disclosure when being implemented.
Figure 9:
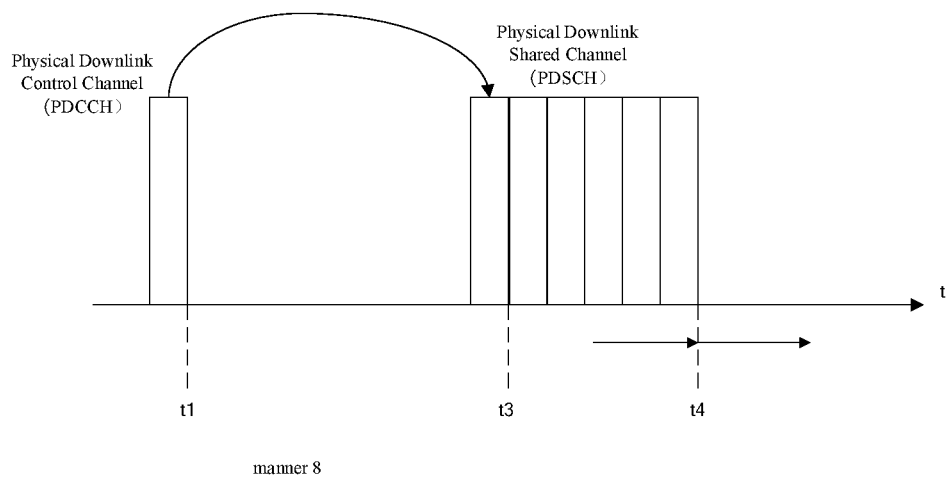
Figure 9:
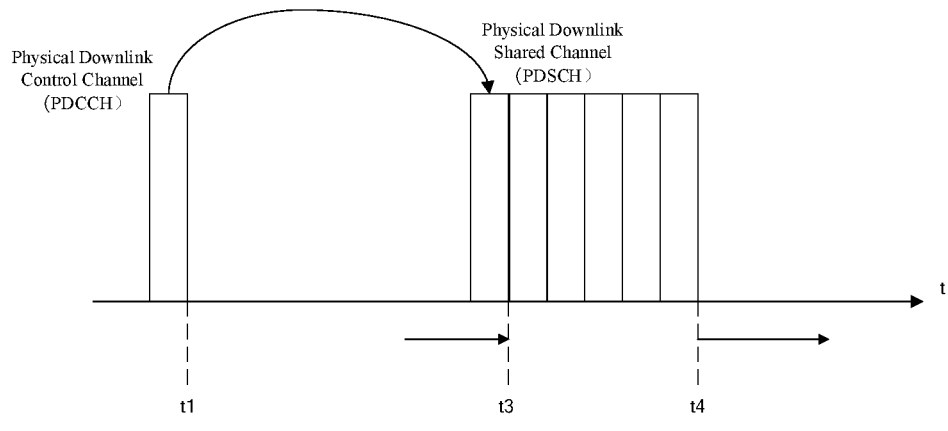

The manner 5, the manner 6, the manner 7, the manner 8 and the manner 9 are similar to the manner 4. When the manner 5, the manner 6, the manner 7, the manner 8 or the manner 9 is used to start the discontinuous reception downlink retransmission timer in the step 706, the time-frequency diagrams in implementation are shown by the manner 5 in FIG. 8, the manner 6 in FIG. 8, the manner 7 in FIG. 9, the manner 8 in FIG. 9, and the manner 9 in FIG. 9. Exemplary:

For the manner 5, the UE stops the discontinuous reception downlink retransmission timer corresponding to the HARQ process used for the downlink data at the time t1, and starts the discontinuous reception downlink retransmission timer corresponding to the HARQ process used for the downlink data at the time t3.

For the manner 6, the UE stops the discontinuous reception downlink retransmission timer corresponding to the HARQ process used for the downlink data at the time t1, and starts the discontinuous reception downlink retransmission timer corresponding to the HARQ process used for the downlink data at the time t4.

For the manner 7, the UE starts or restarts the discontinuous reception downlink retransmission timer corresponding to the HARQ process used for the downlink data at the time t3.

For the manner 8, the UE starts or restarts the discontinuous reception downlink retransmission timer corresponding to the HARQ process used for the downlink data at the time t4.

For the manner 9, the UE stops the discontinuous reception downlink retransmission timer corresponding to the HARQ process used for the downlink data at the time t3, and starts the discontinuous reception downlink retransmission timer corresponding to the HARQ process used for the downlink data at the time t4.

In summary, in the method for data transmission provided by the embodiments of the present disclosure, when the downlink data is the downlink data that is dynamically scheduled and the repeated transmission mode is used therefor, when the discontinuous reception HARQ feedback is in the disabled state, the discontinuous reception of data is realized by starting or restarting the discontinuous reception downlink retransmission timer corresponding to the HARQ process used for the downlink data at the time when the scheduling information of the downlink data is received, at the first symbol after the first repeated transmission of the downlink data is received, or at the first symbol after the last repeated transmission of the downlink data is received, which can improve the sensitivity of the UE to receive the PDCCH, and improve the probability of reception.

The discontinuous reception downlink retransmission timer corresponding to the downlink HARQ process used for the downlink data is stopped at the time when the scheduling information of the downlink data is received or at the first symbol after the first repeated transmission of the downlink data is received, and the discontinuous reception downlink retransmission timer corresponding to the HARQ process used for the downlink data is started at the first symbol after the first repeated transmission of the downlink data is received, or at the first symbol after the last repeated transmission of the downlink data is received. Since there is a high probability that the network side device will not perform retransmission scheduling between the time t1 and the time t3/t4, stopping the discontinuous reception downlink retransmission timer (not monitoring the PDCCH) during this period can reduce the UE's monitoring time on the PDCCH, and facilitates the UE to save power and increase battery life.

Regarding the Third Situation, the Downlink Data is Semi-Persistently Scheduled and the Single Transmission Mode is Used for the Downlink Data.

Figure 10:
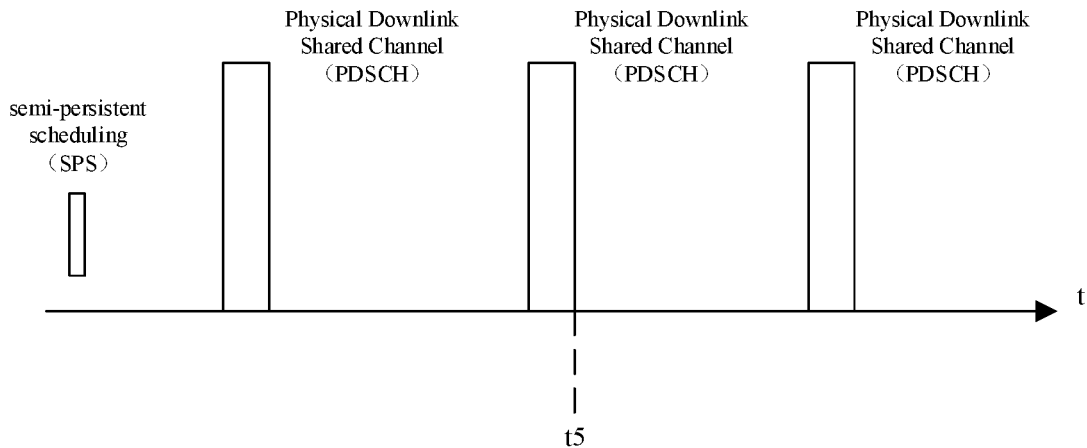
FIG. 10 is a time-frequency schematic diagram of a method for data transmission provided by an exemplary embodiment of the present disclosure.

FIG. 10 shows a time-frequency schematic diagram of downlink data that is semi-persistently scheduled and for which the single transmission mode is used in a transmission process. As shown in FIG. 10, the network side device sends semi-persistent scheduling signaling (SPS) to the UE, and the UE learns a time-frequency resource position (PDSCH) of the downlink data sent periodically according to the semi-persistent scheduling signaling (SPS), and then the UE periodically receives the downlink data carried in the PDSCH. Downlink data in one of the cycles is taken as an example, and in FIG. 10, it is assumed that the time at the first symbol after the downlink data is received is t5.

Exemplarily, the manner of starting or restarting the discontinuous reception downlink retransmission timer in the downlink reception process includes at least the following manner.

Manner 10: the discontinuous reception downlink retransmission timer corresponding to the downlink HARQ process used for the downlink data is started or restarted at the first symbol after the downlink data is received.

Figure 11:
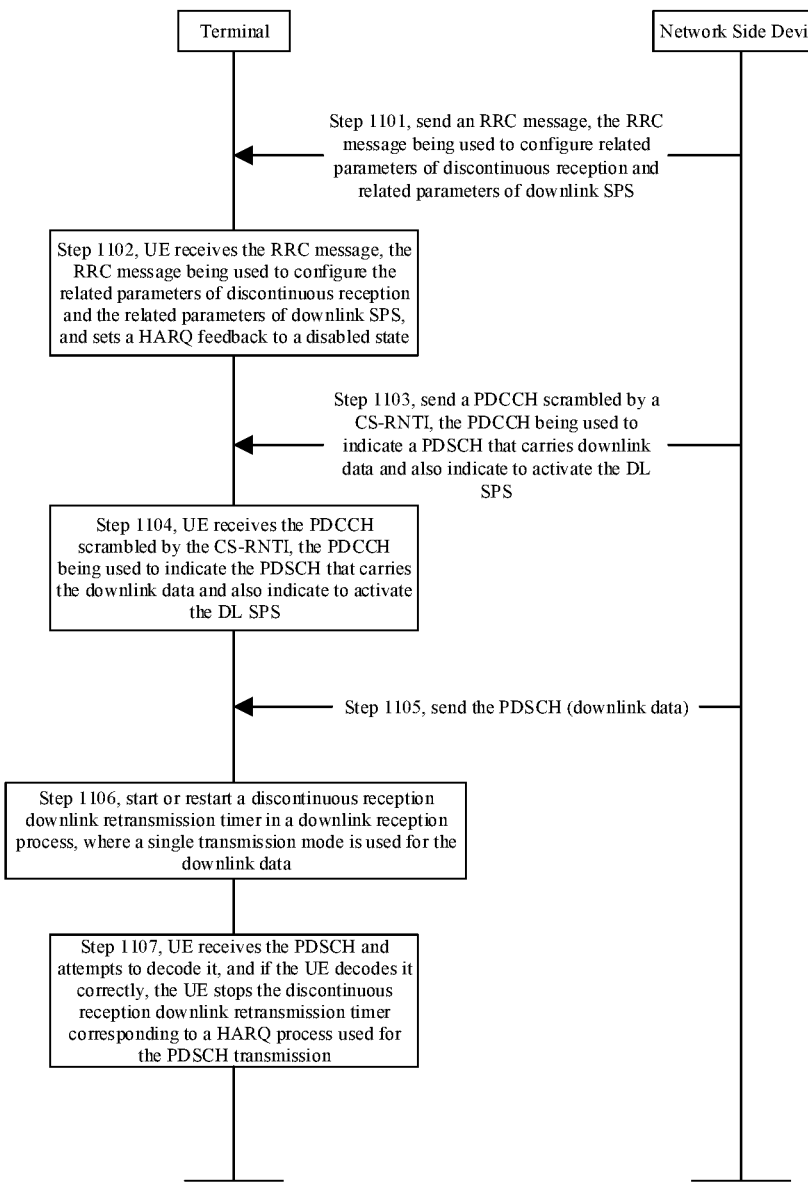
FIG. 11 is a flowchart of a method for data transmission provided by an exemplary embodiment of the present disclosure.
Figure 12:
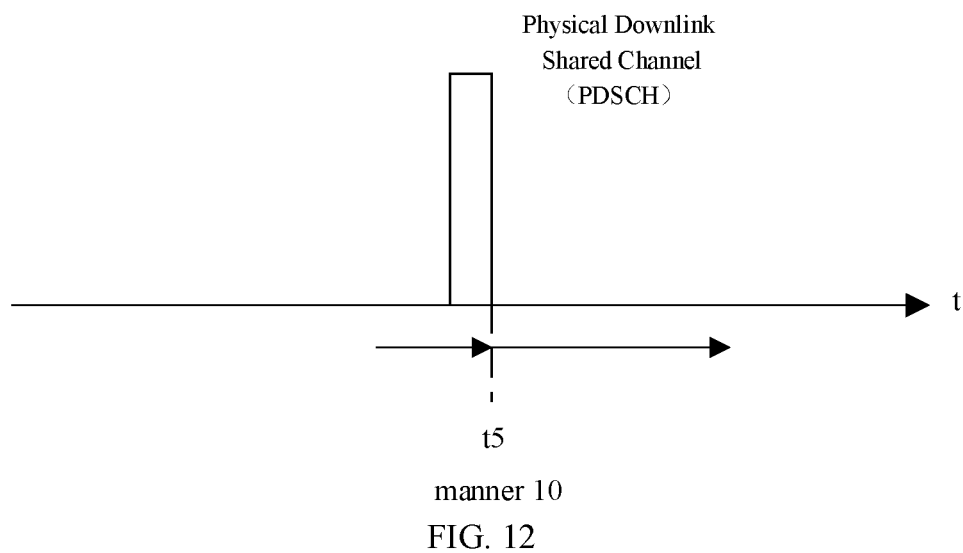
FIG. 12 is a time-frequency schematic diagram of a method for data transmission provided by an exemplary embodiment of the present disclosure when being implemented.

The manner 10 is taken as example and is described in conjunction with FIG. 11 and FIG. 12. FIG. 11 is a flowchart of a method for data transmission provided by an exemplary embodiment of the present disclosure, and FIG. 12 is a time-frequency schematic diagram of the method for data transmission provided by the embodiment shown in FIG. 11 when being implemented. A specific implementation process is as follows.

In step 1101, the network side device sends an RRC message, where the RRC message is used to configure related parameters of discontinuous reception and related parameters of downlink SPS.

The related parameters of discontinuous reception include: the DRX cycle, the drx-onDurationTimer, the drx-InactivityTimer, the drx-RetransmissionTimerDL, etc. A serving cell of the UE is configured with at least one downlink bandwidth (DL BWP), and the DL BWP is configured with downlink (DL) SPS. Downlink SPS configuration parameters include: configured scheduling radio network temporary identifier (CS-RNTI), the number of HARQ processes reserved for SPS, a SPS cycle, etc.

In step 1102, the UE receives the RRC message, the RRC message being used to configure the related parameters of discontinuous reception and the related parameters of downlink SPS, and sets the HARQ feedback to the disabled state.

In step 1103, the network side device sends the PDCCH scrambled by the CS-RNTI, where the PDCCH is used to indicate the PDSCH that carries the downlink data and also indicate to activate the DL SPS.

In step 1104, the UE receives the PDCCH scrambled by the CS-RNTI, where the PDCCH is used to indicate the PDSCH that carries the downlink data and also indicate to activate the DL SPS.

In step 1105, the network side device sends the PDSCH (downlink data).

In step 1106, the discontinuous reception downlink retransmission timer is started or restarted in the downlink reception process, where the single transmission mode is used for the downlink data.

The discontinuous reception downlink retransmission timer corresponding to the downlink HARQ process used for the downlink data is started or restarted at the first symbol after the downlink data is received, as shown by the manner 10 in FIG. 11. That is, the discontinuous reception downlink retransmission timer corresponding to the downlink HARQ process used for the downlink data is started or restarted at time t5.

In step 1107, the UE receives the PDSCH and attempts to decode it. If the UE decodes it correctly, the UE stops the discontinuous reception downlink retransmission timer corresponding to the HARQ process used for the PDSCH transmission.

Exemplarily, when the downlink data is successfully decoded, the terminal stops the discontinuous reception downlink retransmission timer; when decoding of the downlink data fails, the terminal continues to run the discontinuous reception downlink retransmission timer (until the timer expires or the terminal receives a retransmission scheduling of the downlink data).

In summary, in the method for data transmission provided by the embodiments of the present disclosure, when the downlink data is the semi-persistently scheduled downlink data, when the discontinuous reception HARQ feedback is in the disabled state, the discontinuous reception of data is realized by starting or restarting the discontinuous reception downlink retransmission timer corresponding to the downlink HARQ process used for the downlink data at the first symbol after the downlink data is received, which can improve the sensitivity of the UE to receive the PDCCH, and improve the probability of reception.

Regarding the Fourth Situation, the Downlink Data is Semi-Persistently Scheduled and the Repeated Transmission Mode is Used for the Downlink Data.

Figure 13:
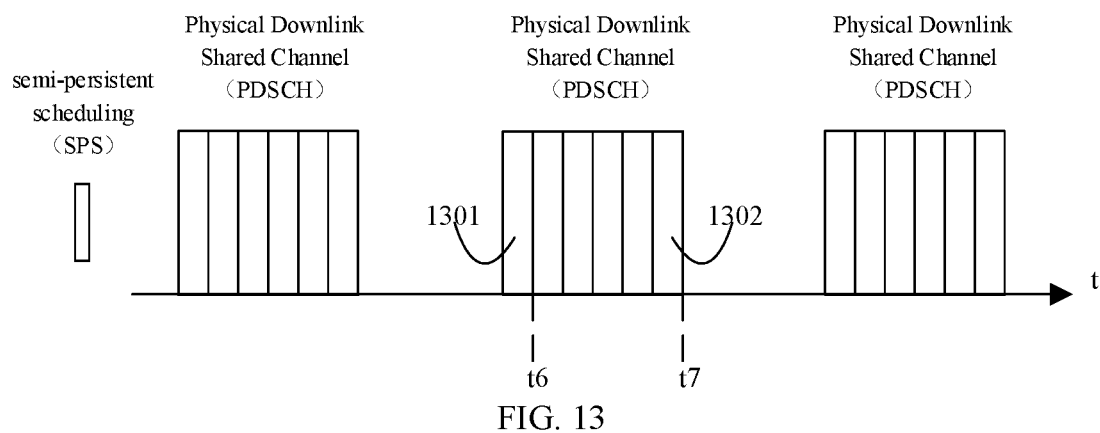
FIG. 13 is a time-frequency schematic diagram of a method for data transmission provided by an exemplary embodiment of the present disclosure.

FIG. 13 shows a time-frequency schematic diagram of downlink data that is semi-persistently scheduled and for which the repeated transmission mode is used in a transmission process. As shown in FIG. 13, the network side device sends semi-persistent scheduling signaling (SPS) to the UE, and the UE learns a time-frequency resource position (PDSCH) of the downlink data sent periodically according to the semi-persistent scheduling signaling (SPS), and then the UE periodically receives the downlink data carried in the PDSCH, and the downlink data may be transmitted on the PDSCH in the repeated transmission mode for 6 repetitions (data copies). Downlink data in one of the cycles is taken as an example, and in FIG. 13, it is assumed that the time at the first symbol after the first repeated transmission 1301 of the downlink data is received is t6, and the time at the first symbol after the last repeated transmission 1302 of the downlink data is received is t7.

Exemplarily, the manner of starting or restarting the discontinuous reception downlink retransmission timer in the downlink reception process includes at least the following manners.

Manner 11: the discontinuous reception downlink retransmission timer corresponding to the downlink HARQ process used for the downlink data is started or restarted at the first symbol after the first repeated transmission of the downlink data is received.

Manner 12: the discontinuous reception downlink retransmission timer corresponding to the downlink HARQ process used for the downlink data is started or restarted at the first symbol after the last repeated transmission of the downlink data is received.

Manner 13: the discontinuous reception downlink retransmission timer corresponding to the downlink HARQ process used for the downlink data is stopped at the first symbol after the first repeated transmission of the downlink data is received; and the discontinuous reception downlink retransmission timer corresponding to the downlink HARQ process used for the downlink data is started at the first symbol after the last repeated transmission of the downlink data is received.

Figure 14:
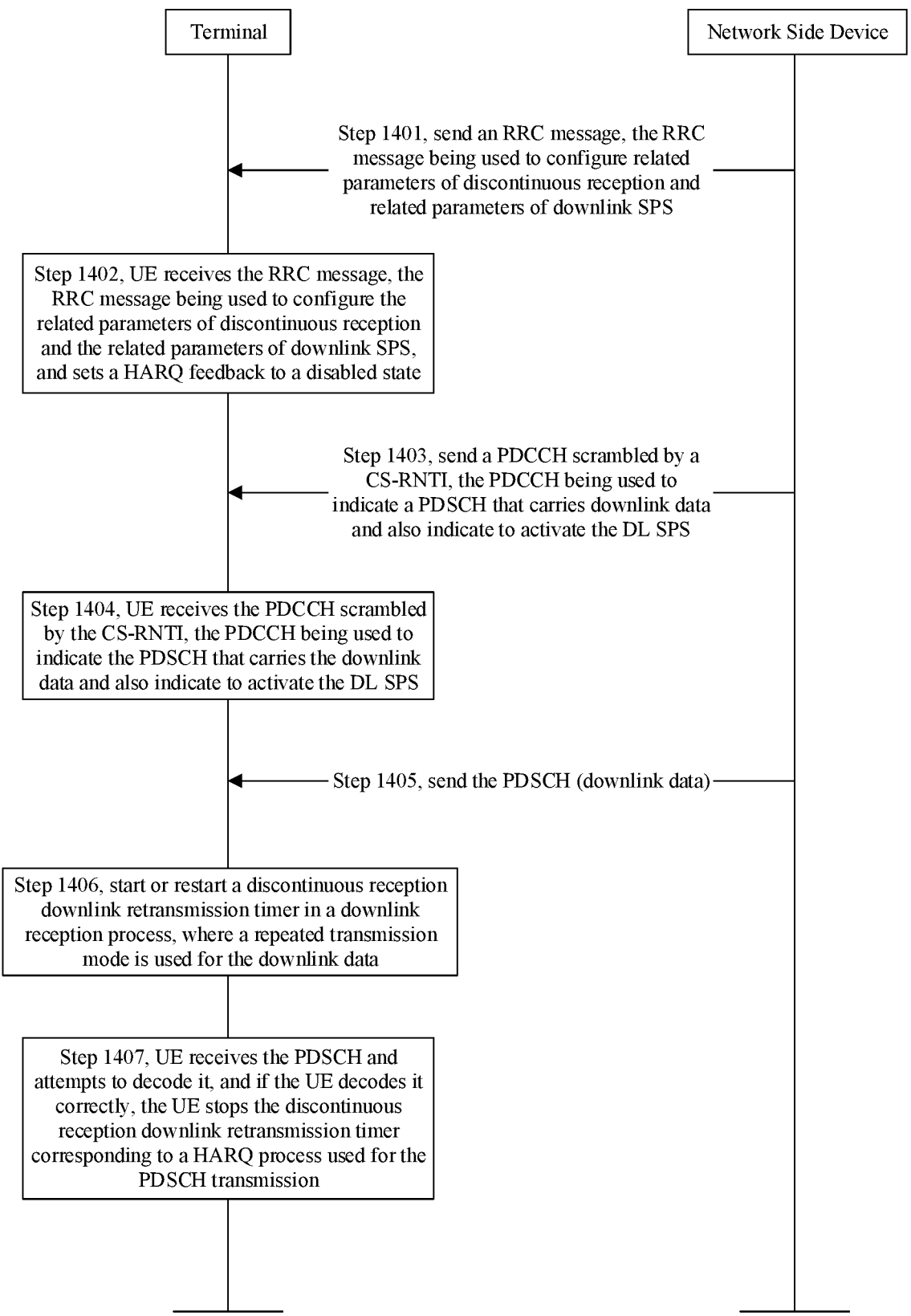
FIG. 14 is a flowchart of a method for data transmission provided by an exemplary embodiment of the present disclosure.
Figure 15:
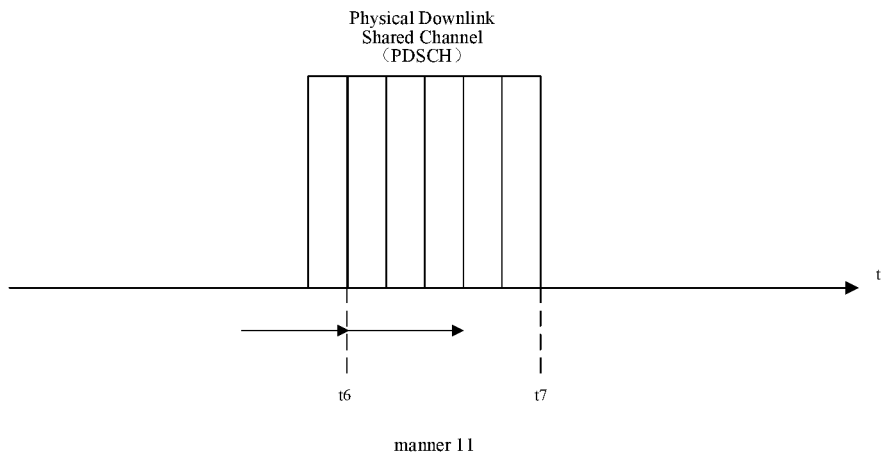
FIG. 15 is a time-frequency schematic diagram of a method for data transmission provided by an exemplary embodiment of the present disclosure when being implemented.
Figure 15:
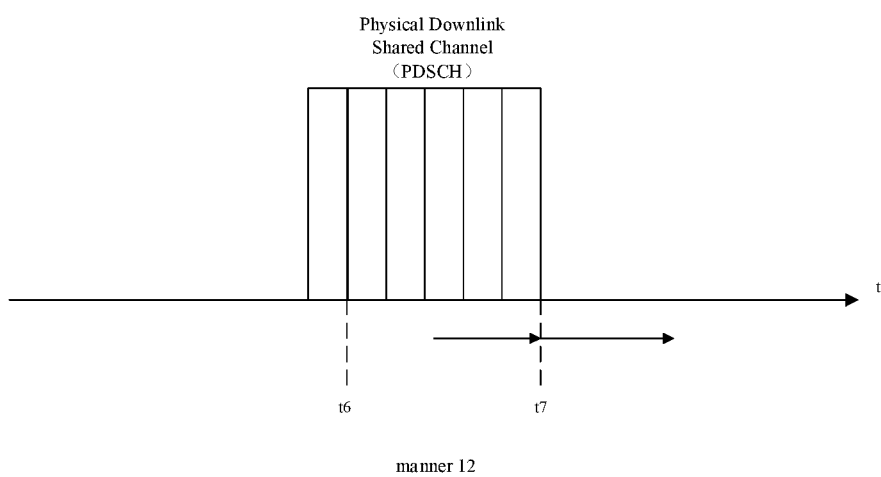
Figure 15:
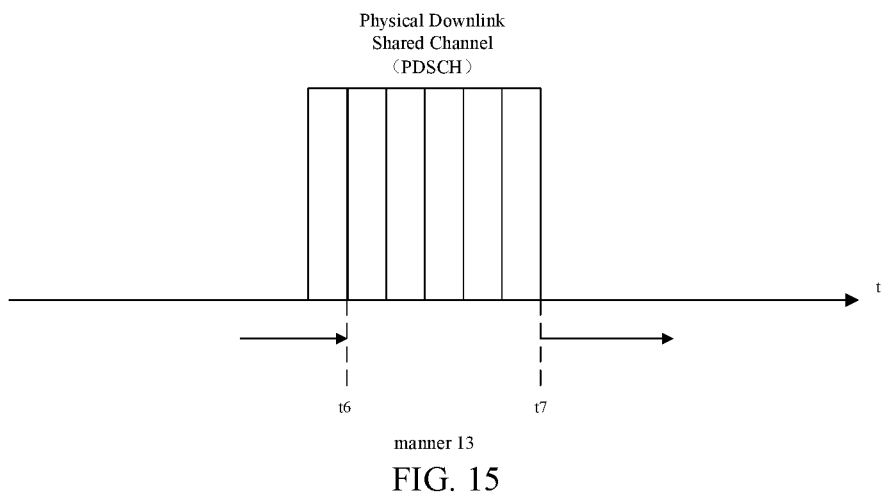

The manner 11 is taken as an example and is described in conjunction with FIG. 14 and FIG. 15. FIG. 14 is a flowchart of a method for data transmission provided by an exemplary embodiment of the present disclosure, and FIG. 15 is a time-frequency schematic diagram of the method for data transmission provided by the embodiment shown in FIG. 14 when being implemented. A specific implementation process is as follows.

In step 1401, the network side device sends an RRC message, where the RRC message is used to configure related parameters of discontinuous reception and related parameters of downlink SPS.

The related parameters of discontinuous reception include: the DRX cycle, the drx-onDurationTimer, the drx-InactivityTimer, the drx-RetransmissionTimerDL, etc. A serving cell of the UE is configured with at least one DL BWP, and the DL BWP is configured with DL SPS. Downlink SPS configuration parameters include: CS-RNTI, the number of HARQ processes reserved for SPS, the SPS cycle, etc.

In step 1402, the UE receives the RRC message, the RRC message being used to configure the related parameters of discontinuous reception and the related parameters of downlink SPS, and sets the HARQ feedback to the disabled state.

In step 1403, the network side device sends the PDCCH scrambled by the CS-RNTI, where the PDCCH is used to indicate the PDSCH that carries the downlink data and also indicate to activate the DL SPS.

In step 1404, the UE receives the PDCCH scrambled by the CS-RNTI, where the PDCCH is used to indicate the PDSCH that carries the downlink data and also indicate to activate the DL SPS.

In step 1405, the discontinuous reception downlink retransmission timer is started or restarted in the downlink reception process, where the repeated transmission mode is used for the downlink data.

The discontinuous reception downlink retransmission timer corresponding to the downlink HARQ process used for the downlink data is started or restarted at the first symbol after the first repeated transmission of the downlink data is received, as shown by the manner 11 in FIG. 15. That is, the discontinuous reception downlink retransmission timer corresponding to the downlink HARQ process used for the downlink data is started or restarted at time t6.

In step 1406, the UE receives the PDSCH and attempts to decode it. If the UE decodes it correctly, the UE stops the discontinuous reception downlink retransmission timer corresponding to the HARQ process used for the PDSCH transmission.

Exemplarily, when the downlink data is successfully decoded, the terminal stops the discontinuous reception downlink retransmission timer; when the decoding of the downlink data fails, the terminal continues to run the discontinuous reception downlink retransmission timer (until the timer expires or the terminal receives a retransmission scheduling of the downlink data).

The manner 12 and the manner 13 are similar to the manner 11. When the manner 12 or the manner 13 is used to start the discontinuous reception downlink retransmission timer in the step 1405, the time-frequency diagrams in implementation are shown by the manner 12 in FIG. 15 and the manner 13 in FIG. 15. Exemplary, for the manner 12, the UE starts or restarts the discontinuous reception downlink retransmission timer corresponding to the HARQ process used for the downlink data at the time t7. For the manner 13, the UE stops the discontinuous reception downlink retransmission timer corresponding to the HARQ process used for the downlink data at the time t6, and starts the discontinuous reception downlink retransmission timer corresponding to the HARQ process used for the downlink data at the time t7.

In summary, in the method for data transmission provided by the embodiments of the present disclosure, when the downlink data is semi-persistently scheduled and the repeated transmission mode is used for the downlink data, the discontinuous reception of data is realized when the discontinuous reception HARQ feedback is in the disabled state by starting or restarting the discontinuous reception downlink retransmission timer corresponding to the HARQ process used for the downlink data at the first symbol after the first repeated transmission of the downlink data is received, or at the first symbol after the last repeated transmission of the downlink data is received, which can improve the sensitivity of the UE to receive the PDCCH, and reduce the error rate of discontinuous reception.

The discontinuous reception downlink retransmission timer corresponding to the HARQ process used for the downlink data is stopped at the first symbol after the first repeated transmission of the downlink data is received, and the discontinuous reception downlink retransmission timer corresponding to the HARQ process used for the downlink data is started at the first symbol after the last repeated transmission of the downlink data is received. When the discontinuous reception HARQ feedback is in the disabled state, since there is a high probability that the network side device will not perform retransmission scheduling between the time t1 and the time t6/t7, stopping the discontinuous reception downlink retransmission timer (not monitoring the PDCCH) during this period can reduce the UE's monitoring time on the PDCCH, and facilitates the UE to save power and increase battery life.

The above thirteen manners of starting the discontinuous reception downlink retransmission timer can be applied to each downlink data transmission so that the discontinuous reception downlink retransmission timer corresponding to the HARQ process used for the downlink data is started or restarted each time the downlink data is transmitted; or applied to only the initial transmission of the downlink data so that the discontinuous reception downlink retransmission timer corresponding to the HARQ process used for the downlink data is started or restarted only for the initially transmitted downlink data. Four exemplary embodiments are given below for illustration, which are respectively: a first exemplary embodiment in which the downlink data is dynamically scheduled, and the discontinuous reception downlink retransmission timer corresponding to the HARQ process used for the downlink data is started or restarted for each downlink data transmission; a second exemplary embodiment in which the downlink data is semi-persistently scheduled, and the discontinuous reception downlink retransmission timer corresponding to the HARQ process used for the downlink data is started or restarted for each downlink data transmission; a third exemplary embodiment in which the downlink data is dynamically scheduled, and the discontinuous reception downlink retransmission timer corresponding to the HARQ process used for the downlink data is started or restarted only for initial transmission of the downlink data; and a fourth exemplary embodiment in which the downlink data is semi-persistently scheduled, and the discontinuous reception downlink retransmission timer corresponding to the HARQ process used for the downlink data is started or restarted only for initial transmission of the downlink data.

It should be noted that the sequence numbers of the foregoing four exemplary embodiments are only used to distinguish between different embodiments, and do not represent the order or the distinction between superiority and inferiority.

In the first exemplary embodiment, the downlink data is dynamically scheduled, and the discontinuous reception downlink retransmission timer corresponding to the HARQ process used for the downlink data is started or restarted for each downlink data transmission.

Figure 16:
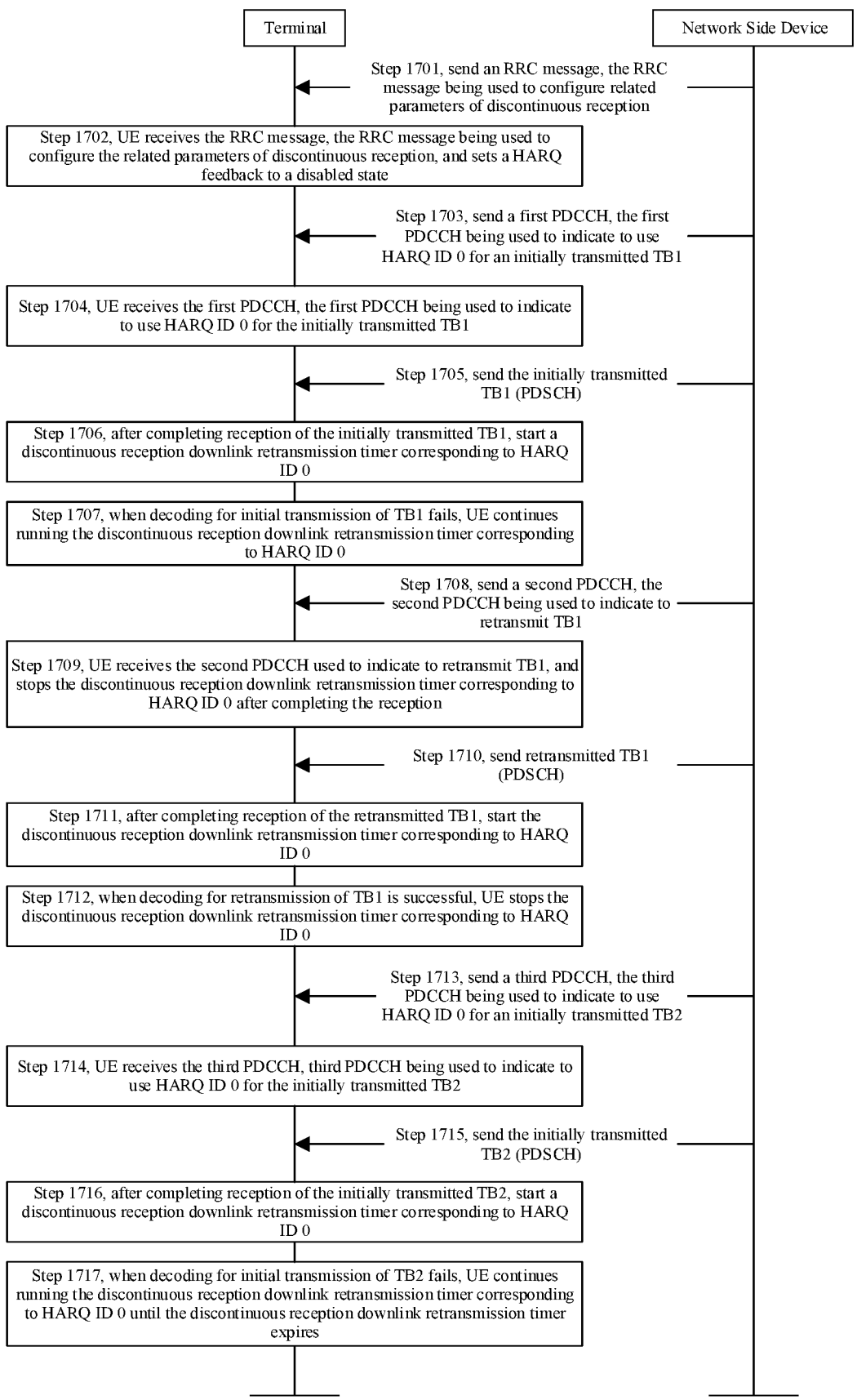
FIG. 16 is a flowchart of a method for data transmission provided by an exemplary embodiment of the present disclosure.
Figure 17:
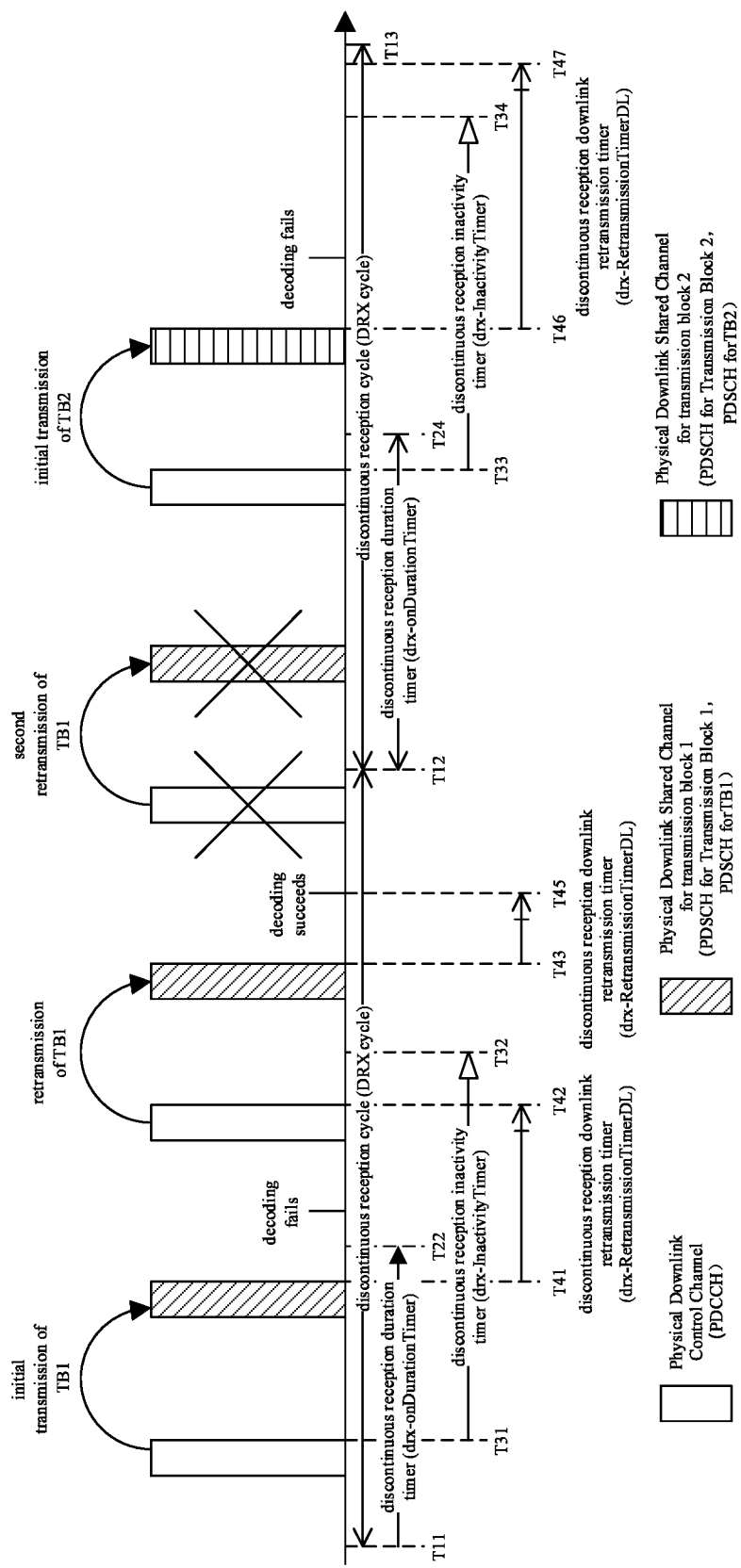
FIG. 17 is a time-frequency schematic diagram of a method for data transmission provided by an exemplary embodiment of the present disclosure when being implemented.

Referring to FIGS. 16 and 17, FIG. 16 is a flowchart of a method for data transmission provided by an exemplary embodiment of the present disclosure, and FIG. 17 is a time-frequency schematic diagram of the method for data transmission provided by the embodiment shown in FIG. 16 when being implemented.

The method includes at least the following steps.

In step 1701, the network side device sends an RRC message, where the RRC message is used to configure related parameters of discontinuous reception.

The related parameters of discontinuous reception include: the DRX cycle, the drx-onDurationTimer, the drx-InactivityTimer, the drx-RetransmissionTimerDL, etc.

In step 1702, the UE receives the RRC message, the RRC message being used to configure the related parameters of discontinuous reception, and sets the HARQ feedback to the disabled state.

At the time T11 when a first DRX cycle begins, the UE starts the drx-onDurationTimer.

In step 1703, the network side device sends a first PDCCH.

In step 1704, the UE receives the first PDCCH, where the first PDCCH is used to indicate to use HARQ ID 0 for an initially transmitted TB1.

After receiving the first PDCCH, the UE starts the drx-InactivityTimer at time T31.

In step 1705, the network side device sends the initially transmitted TB1.

In step 1706, after completing the reception of the initially transmitted TB1, the UE starts the discontinuous reception downlink retransmission timer corresponding to HARQ ID 0.

The UE receives the PDSCH on the resource indicated by the PDCCH, and after completing the reception of the PDSCH, the UE starts the discontinuous reception downlink retransmission timer corresponding to HARQ ID 0. After completing the reception of the initially transmitted TB1, the UE starts the drx-RetransmissionTimerDL at time T41.

In step 1707, when the decoding for the initial transmission of TB1 fails, the UE continues running the discontinuous reception downlink retransmission timer corresponding to HARQ ID 0.

Exemplarily, when TB1 is successfully decoded, the terminal stops the discontinuous reception downlink retransmission timer; when decoding of the downlink data fails, the terminal continues to run the discontinuous reception downlink retransmission timer (until the timer expires or a retransmission scheduling of the downlink data is received). The drx-onDurationTimer expires and stops at time T22.

In step 1708, the network side device sends a second PDCCH.

In step 1709, the UE receives the second PDCCH, where the second PDCCH is used to indicate to retransmit TB1. After the reception is completed, the discontinuous reception downlink retransmission timer corresponding to HARQ ID 0 is stopped.

After the second PDCCH is completed, the UE stops the drx-RetransmissionTimerDL at time T42. The drx-InactivityTimer expires and stops at time T32.

In step 1710, the network side device sends the retransmitted TB1.

In step 1711, after completing the reception of the retransmitted TB1, the UE starts the discontinuous reception downlink retransmission timer corresponding to HARQ ID 0.

The UE receives the PDSCH on the resource indicated by the PDCCH, and after completing the reception of PDSCH, the UE starts the discontinuous reception downlink retransmission timer corresponding to HARQ ID 0. After completing the reception of the retransmitted TB1, the UE starts the drx-RetransmissionTimerDL at time T43.

In step 1712, when the decoding for the retransmission of TB1 is successful, the UE stops the discontinuous reception downlink retransmission timer corresponding to HARQ ID 0.

Exemplarily, when TB1 is successfully decoded, the terminal stops the discontinuous reception downlink retransmission timer; when the decoding of TB1 fails, the terminal continues to run the discontinuous reception downlink retransmission timer (until the timer expires or a retransmission scheduling of TB1 is received). After the decoding for the retransmission of TB1 is successful, the UE stops the drx-RetransmissionTimerDL at time T45. Thereafter, the network side device schedules a second retransmission of TB2. Since the drx-onDurationTimer, the drx-InactivityTimer and the drx-RetransmissionTimerDL are all not running at this time and the UE is in the DRX dormant state, the UE does not monitor the PDCCH indicating the second retransmission scheduling of TB2, and does not receive the corresponding PDSCH. At the time T12 when the first DRX cycle ends and the second DRX cycle begins, the UE starts the drx-onDurationTimer.

In step 1713, the network side device sends a third PDCCH.

In step 1714, the UE receives the third PDCCH, where the third PDCCH is used to indicate to use HARQ ID 0 for an initially transmitted TB2.

After receiving the third PDCCH, the UE starts the drx-InactivityTimer at the time T33. The drx-onDurationTimer expires and stops at the time T24.

In step 1715, the network side device sends the initially transmitted TB2.

In step 1716, after completing the reception of the initially transmitted TB2, the UE starts the discontinuous reception downlink retransmission timer corresponding to HARQ ID 0.

The UE receives the PDSCH on the resource indicated by the PDCCH, and after completing the reception of PDSCH, the UE starts the discontinuous reception downlink retransmission timer corresponding to HARQ ID 0. After completing the reception of the initially transmitted TB2, the UE starts the drx-RetransmissionTimerDL at the time T46.

In step 1717, when the decoding of the initial transmission of TB2 fails, the UE continues running the discontinuous reception downlink retransmission timer corresponding to HARQ ID 0 until the discontinuous reception downlink retransmission timer expires.

Exemplarily, when TB1 is successfully decoded, the terminal stops the discontinuous reception downlink retransmission timer; when decoding of TB1 fails, the terminal continues to run the discontinuous reception downlink retransmission timer (until the timer expires or the terminal receives a retransmission scheduling of TB1). The drx-InactivityTimer expires and stops at the time T34. The drx-RetransmissionTimerDL expires and stops at the time T47. The second DRX cycle ends at the time T13.

FIG. 17 schematically illustrates a transmission process in which dynamic scheduling is used and a discontinuous reception downlink retransmission timer corresponding to a HARQ process used for downlink data is started or restarted for each downlink data transmission. As shown in FIG. 17, time-frequency diagrams of four downlink data transmissions are shown, and the four downlink data transmissions include: a first transmission, an initial transmission of TB1; a second transmission, a retransmission of TB1; a third transmission, a second retransmission TB1; and a fourth transmission, an initial transmission of TB2.

The network side device (sender) first transmits the PDCCH to the terminal for each transmission, the PDCCH carries the DCI, and the DCI is used to schedule the physical downlink shared channel (PDSCH) that carries the downlink data. After receiving the PDCCH, the terminal receives the downlink data carried in the PDSCH according to the scheduling of the DCI.

In the third transmission, that is, the secondly retransmitted TB1, since the terminal is not in a monitoring state, the terminal does not receive the PDCCH and does not receive the PDSCH although the network side device has sent the PDCCH and PDSCH.

In FIG. 17, it is assumed that T11 is a start time of the first DRX cycle; T12 is an end time of the first DRX cycle and a start time of the second DRX cycle; T13 is an end time of the second DRX cycle; T22 is a time when a first drx-onDurationTimer expires and stops; T24 is a time when a second drx-onDurationTimer expires and stops; T31 is a time when the UE receives the scheduling information of the initially transmitted TB1; T32 is a time when a first drx-InactivityTimer expires and stops; T33 is a time when the UE receives the scheduling information of the initially transmitted TB2; T34 is a time when a second drx-InactivityTimer expires and stops; T41 is a time when the reception of the initially transmitted TB1 is completed; T42 is a time when the UE receives the scheduling information of the retransmitted TB1; T43 is a time when the reception of the retransmitted TB1 is completed; T45 is a time when the decoding of the retransmitted TB1 is successful; T46 is a time when the reception of the initially transmitted TB2 is completed; and T47 is a time when a third drx-RetransmissionTimerDL expires and stops.

In summary, in the method for data transmission provided by the embodiments of the present disclosure, when the downlink data is dynamically scheduled, when the discontinuous reception HARQ feedback is in the disabled state, the discontinuous reception of data is realized by starting or restarting the discontinuous reception downlink retransmission timer corresponding to the HARQ process used for the downlink data for each downlink data transmission, which can improve the sensitivity of the UE to receive the PDCCH, and improve the probability of reception.

In the second exemplary embodiment, the downlink data is semi-persistently scheduled, and the discontinuous reception downlink retransmission timer corresponding to the HARQ process used for the downlink data is started or restarted for each downlink data transmission.

Figure 18:
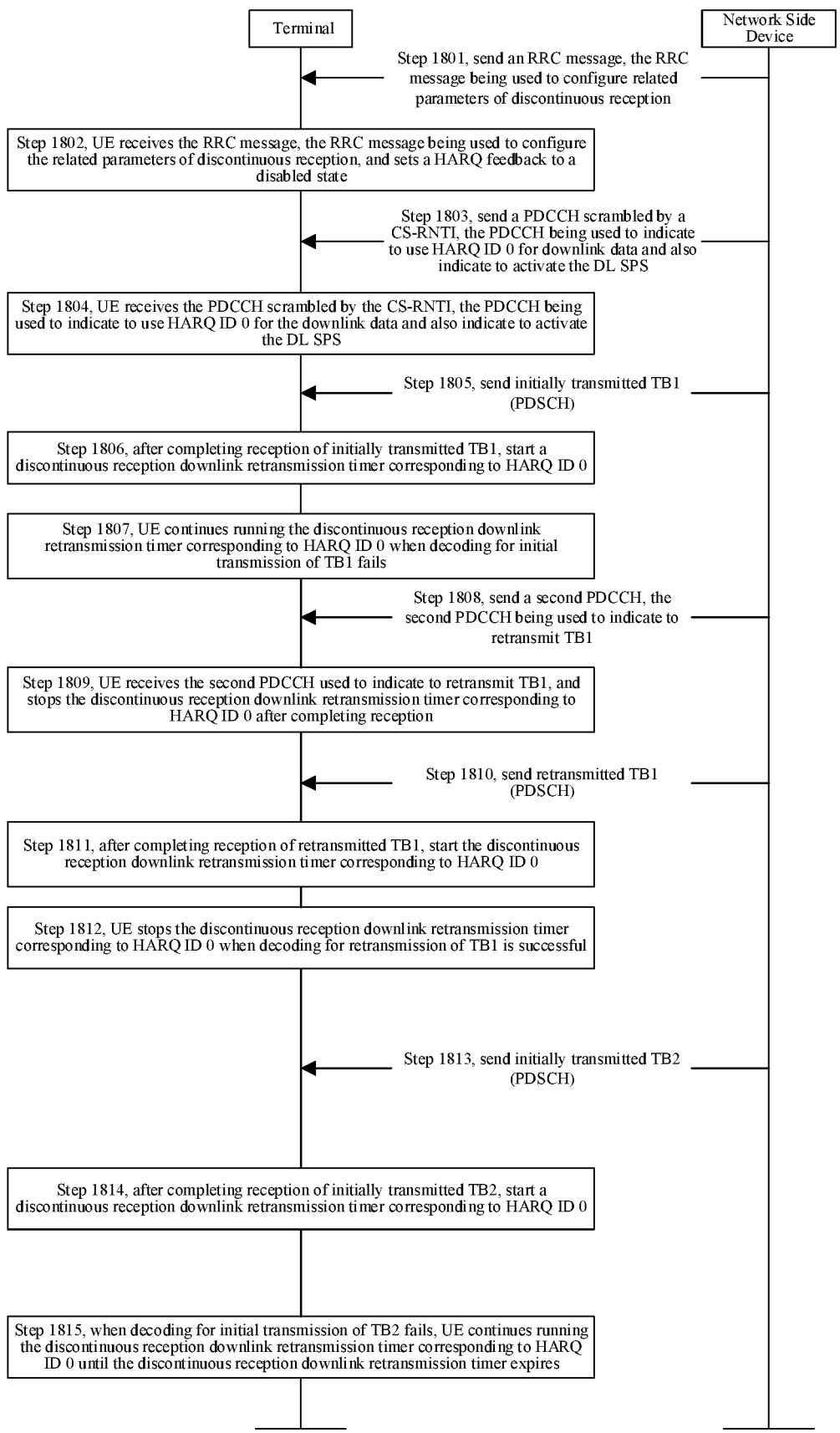
FIG. 18 is a flowchart of a method for data transmission provided by an exemplary embodiment of the present disclosure.
Figure 19:
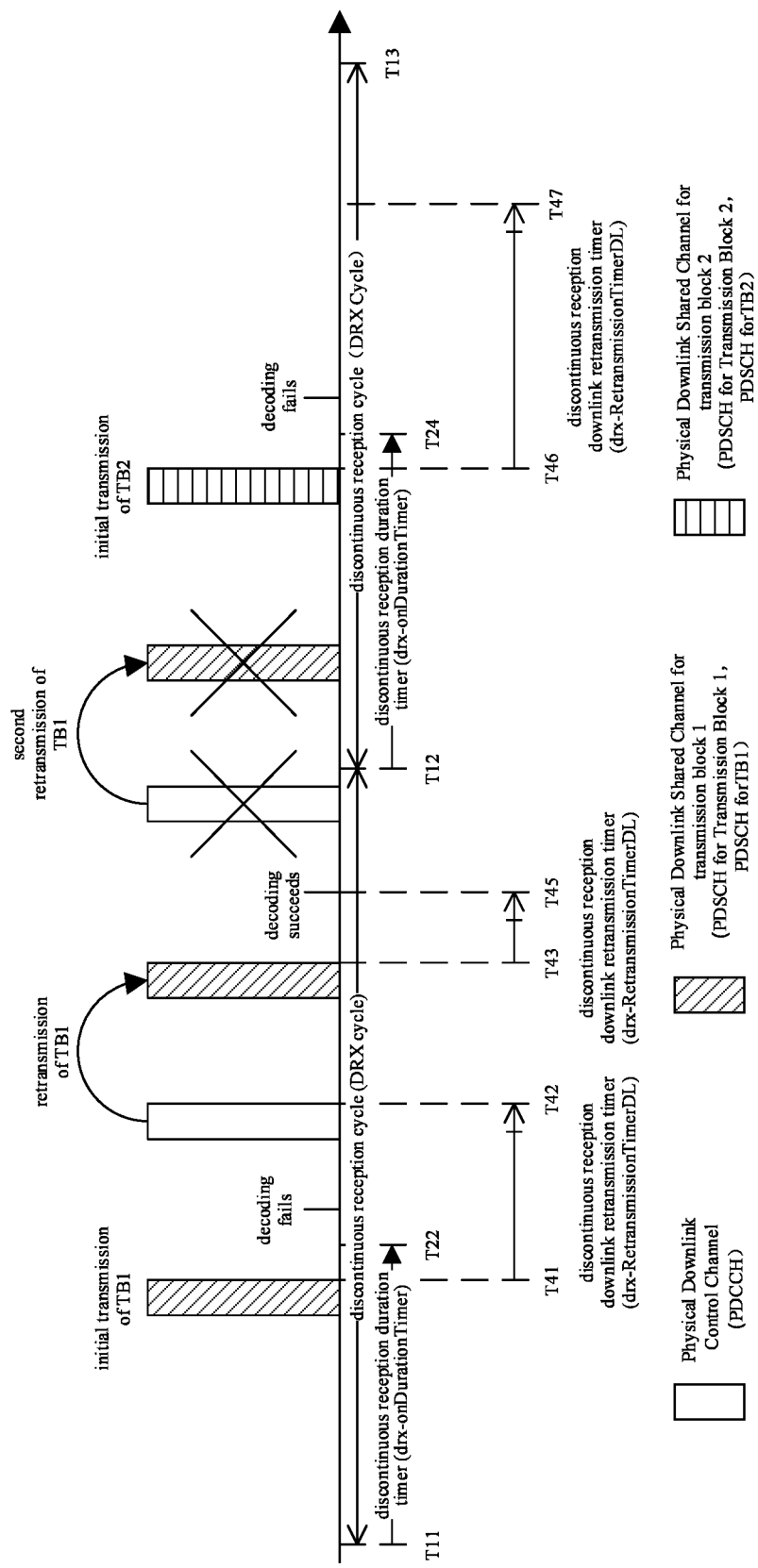
FIG. 19 is a time-frequency schematic diagram of a method for data transmission provided by an exemplary embodiment of the present disclosure when being implemented.

Referring to FIGS. 18 and 19, FIG. 18 is a flowchart of a method for data transmission provided by an exemplary embodiment of the present disclosure, and FIG. 19 is a time-frequency schematic diagram of the method for data transmission provided by the embodiment shown in FIG. 18 when being implemented. The method includes at least the following steps.

In step 1801, the network side device sends an RRC message, where the RRC message is used to configure related parameters of discontinuous reception.

The related parameters of discontinuous reception include: the DRX cycle, the drx-onDurationTimer, the drx-InactivityTimer, the drx-RetransmissionTimerDL, etc. Each serving cell of the UE is configured with at least one DL BWP, and the DL BWP is configured with DL SPS. Downlink SPS configuration parameters include: CS-RNTI, the number of HARQ processes reserved for SPS and the SPS cycle, etc.

In step 1802, the UE receives the RRC message, the RRC message being used to configure the related parameters of discontinuous reception, and sets the HARQ feedback to the disabled state.

At the time T11 when a first DRX cycle begins, the UE starts the drx-onDurationTimer.

In step 1803, the network side device sends the PDCCH scrambled by the CS-RNTI, where the PDCCH is used to indicate to use HARQ ID 0 for the downlink data and also indicate to activate the DL SPS.

In step 1804, the UE receives the PDCCH scrambled by the CS-RNTI, where the PDCCH is used to indicate to use HARQ ID 0 for the downlink data and also indicate to activate the DL SPS.

In step 1805, the network side device sends the initially transmitted TB1 (PDSCH).

In step 1806, after completing the reception of the initially transmitted TB1, the UE starts the discontinuous reception downlink retransmission timer corresponding to HARQ ID 0.

The UE receives the PDSCH on the resource indicated by the PDCCH, and after completing the reception of PDSCH, the UE starts the discontinuous reception downlink retransmission timer corresponding to HARQ ID 0. After completing the reception of the initially transmitted TB1, the UE starts the drx-RetransmissionTimerDL at the time T41.

In step 1807, when the decoding for the initial transmission of TB1 fails, the UE continues running the discontinuous reception downlink retransmission timer corresponding to HARQ ID 0.

Exemplarily, when TB1 is successfully decoded, the terminal stops the discontinuous reception downlink retransmission timer; when the decoding of TB1 fails, the terminal continues to run the discontinuous reception downlink retransmission timer (until the timer expires or a retransmission scheduling of the downlink data is received). The drx-onDurationTimer expires and stops at the time T22.

In step 1808, the network side device sends a second PDCCH, where the second PDCCH is used to indicate to retransmit TB1.

In step 1809, the UE receives the second PDCCH, where the second PDCCH is used to indicate to retransmit TB1. After the reception is completed, the discontinuous reception downlink retransmission timer corresponding to HARQ ID 0 is stopped.

After completion of the second PDCCH, the UE stops the drx-RetransmissionTimerDL at the time T42.

In step 1810, the network side device sends the retransmitted TB1 (PDSCH).

In step 1811, after completing the reception of the retransmitted TB1, the UE starts the discontinuous reception downlink retransmission timer corresponding to HARQ ID 0.

The UE receives the PDSCH on the resource indicated by the PDCCH, and after completing the reception of PDSCH, the UE starts the discontinuous reception downlink retransmission timer corresponding to HARQ ID 0. After completing the reception of the retransmitted TB1, the UE starts the drx-RetransmissionTimerDL at the time T43.

In step 1812, when the decoding for the retransmission of TB1 is successful, the UE stops the discontinuous reception downlink retransmission timer corresponding to HARQ ID 0.

Exemplarily, when TB1 is successfully decoded, the terminal stops the discontinuous reception downlink retransmission timer; when decoding of TB1 fails, the terminal continues to run the discontinuous reception downlink retransmission timer (until the timer expires or a retransmission scheduling of downlink data is received). After the decoding for the retransmission of TB1 is successful, the UE stops the drx-RetransmissionTimerDL at the time T45. Thereafter, the network side device schedules the second retransmission of TB2. Since the drx-onDurationTimer, the drx-InactivityTimer and the drx-RetransmissionTimerDL are all not running at this time, the UE is in the DRX dormant state, and the UE does not detect the PDCCH indicating the second retransmission scheduling of TB2, and does not receive the corresponding PDSCH. At the time T12 when the first DRX cycle ends and the second DRX cycle begins, the UE starts the drx-onDurationTimer.

In step 1813, the network side device sends the initially transmitted TB2 (PDSCH).

In step 1814, after completing the reception of the initially transmitted TB2, the UE starts the discontinuous reception downlink retransmission timer corresponding to HARQ ID 0.

The UE receives the PDSCH on the resource indicated by the PDCCH, and after completing the reception of PDSCH, the UE starts the discontinuous reception downlink retransmission timer corresponding to HARQ ID 0. After completing the reception of the initially transmitted TB2, the UE starts the drx-RetransmissionTimerDL at the time T46. The drx-onDurationTimer expires and stops at the time T24.

In step 1815, when the decoding for the initial transmission of TB2 fails, the UE continues running the discontinuous reception downlink retransmission timer corresponding to HARQ ID 0 until the discontinuous reception downlink retransmission timer expires.

Exemplarily, when TB2 is successfully decoded, the terminal stops the discontinuous reception downlink retransmission timer; when decoding of TB2 fails, the terminal continues to run the discontinuous reception downlink retransmission timer (until the timer expires or a retransmission scheduling of the downlink data is received). The drx-RetransmissionTimerDL expires and stops at the time T47, and the second DRX cycle ends at the time T13.

FIG. 19 schematically illustrates a transmission process in which semi-persistent scheduling is used and a discontinuous reception downlink retransmission timer corresponding to a HARQ process used for downlink data is started or restarted for each downlink data transmission. As shown in FIG. 19, time-frequency diagrams of four downlink data transmissions are shown, and the four downlink data transmissions include: a first transmission, an initial transmission of TB1; a second transmission, a retransmission of TB1; a third transmission, a second retransmission of TB1; and a fourth transmission, an initial transmission of TB2. For the first transmission and the fourth transmission, the terminal receives the downlink data carried in the PDSCH according to the scheduling of the DCI. For the second transmission and the third transmission, the network side device (sender) first transmits the PDCCH to the terminal, the PDCCH carries the DCI, and the DCI is used to schedule the physical downlink shared channel (PDSCH) that carries the downlink data. After receiving the PDCCH, the terminal receives the downlink data carried in the PDSCH according to the scheduling of the DCI. In the third transmission, that is, the second retransmission of TB1, since the terminal is not in a monitoring state, the terminal does not receive the PDCCH and does not receive the PDSCH although the network side device has sent the PDCCH and PDSCH.

In FIG. 19, it is assumed that T11 is a start time of the first DRX cycle; T12 is an end time of the first DRX cycle and a start time of the second DRX cycle; T13 is an end time of the second DRX cycle; T22 is a time when a first drx-onDurationTimer expires and stops; T24 is a time when a second drx-onDurationTimer expires and stops; T41 is a time when the reception of the initially transmitted TB1 is completed; T42 is a time when the UE receives the scheduling information of the retransmitted TB1; T43 is a time when the reception of the retransmitted TB1 is completed; T45 is a time when the decoding of the retransmitted TB1 is successful; T46 is a time when the reception of the initially transmitted TB2 is completed; and T47 is a time when the third drx-RetransmissionTimerDL expires and stops.

In summary, in the method for data transmission provided by the embodiments of the present disclosure, when the downlink data is semi-persistently scheduled, when the discontinuous reception HARQ feedback is in the disabled state, the discontinuous reception of data is realized by starting or restarting the discontinuous reception downlink retransmission timer corresponding to the HARQ process used for the downlink data for each downlink data transmission, which can improve the sensitivity of the UE to receive the PDCCH, and improve the probability of reception.

In the third exemplary embodiment, the downlink data is dynamically scheduled, and the discontinuous reception downlink retransmission timer corresponding to the HARQ process used for the downlink data is started or restarted only for the initial transmission of the downlink data.

Figure 20:
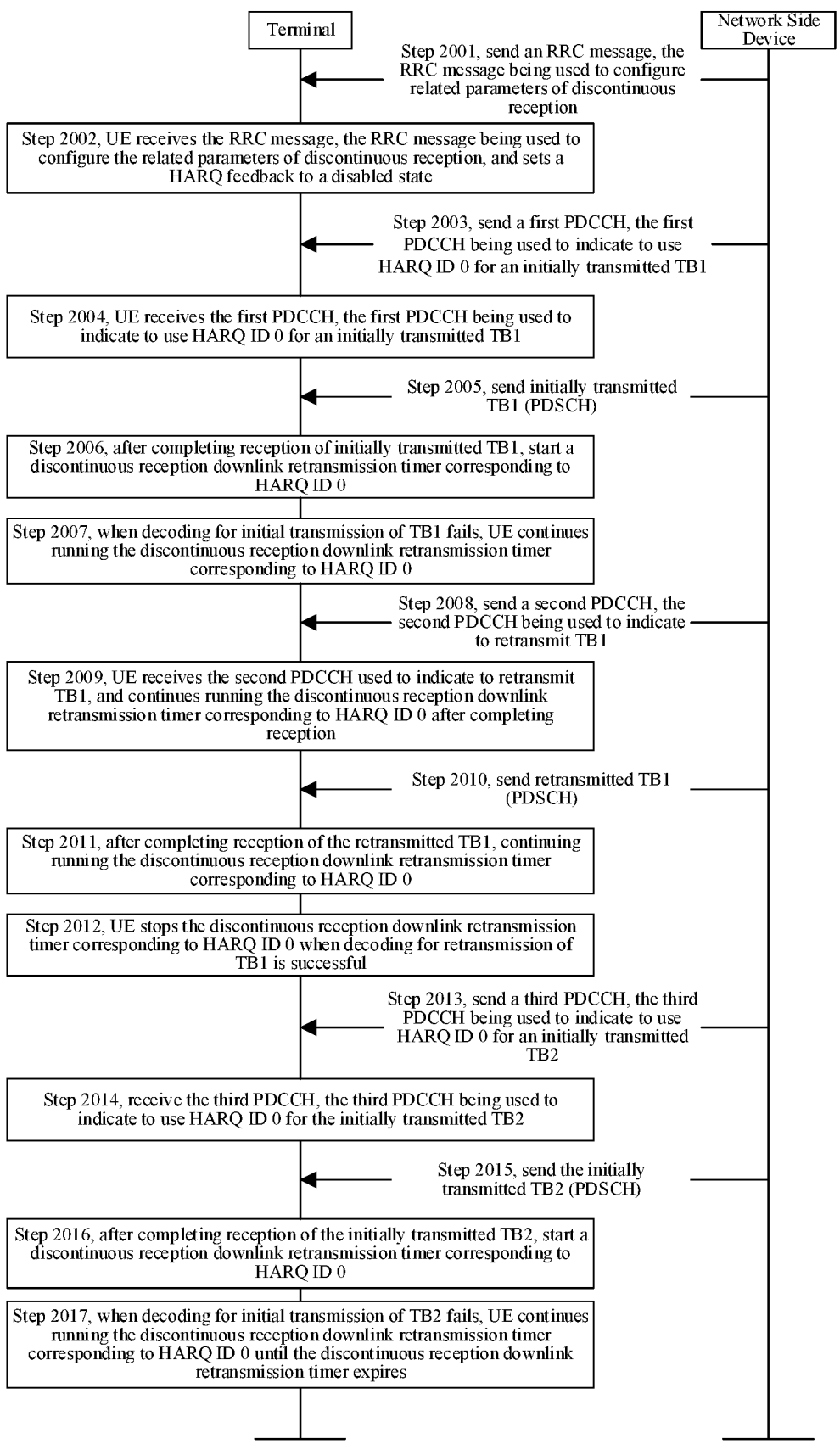
FIG. 20 is a flowchart of a method for data transmission provided by an exemplary embodiment of the present disclosure.
Figure 21:
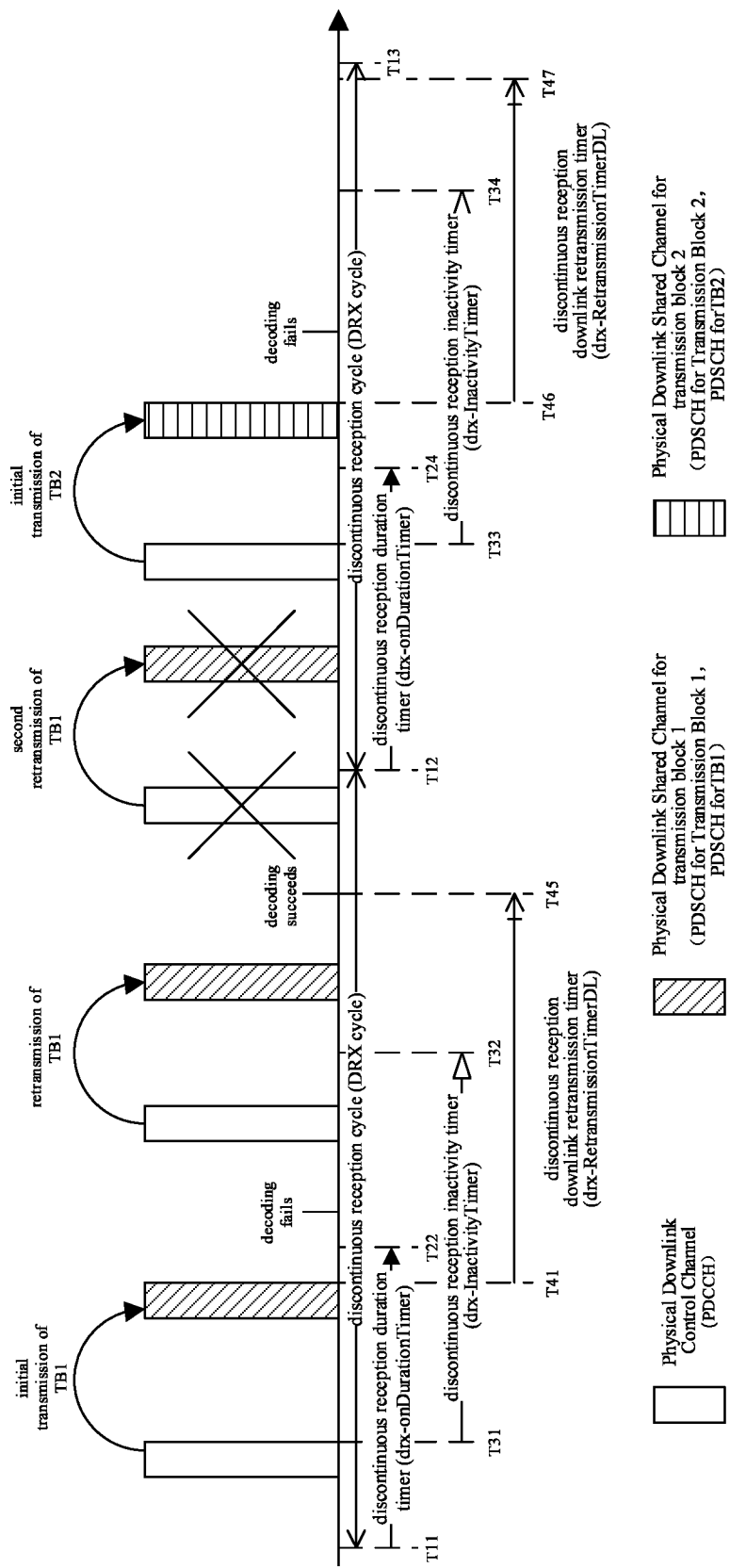
FIG. 21 is a time-frequency schematic diagram of a method for data transmission provided by an exemplary embodiment of the present disclosure when being implemented.

Referring to FIGS. 20 and 21, FIG. 20 is a flowchart of a method for data transmission provided by an exemplary embodiment of the present disclosure, and FIG. 21 is a time-frequency schematic diagram of the method for data transmission provided by the embodiment shown in FIG. 16 when being implemented. The method includes at least the following steps.

In step 2001, the network side device sends an RRC message, where the RRC message is used to configure related parameters of discontinuous reception.

The related parameters of discontinuous reception include: the DRX cycle, the drx-onDurationTimer, the drx-InactivityTimer, the drx-RetransmissionTimerDL, etc.

In step 2002, the UE receives the RRC message, the RRC message being used to configure the related parameters of discontinuous reception, and sets the HARQ feedback to the disabled state.

At the time T11 when a first DRX cycle begins, the UE starts the drx-onDurationTimer.

In step 2003, a first PDCCH is sent, where the first PDCCH is used to indicate to use HARQ ID 0 for an initially transmitted TB1.

In step 2004, the UE receives the first PDCCH, where the first PDCCH is used to indicate to use HARQ ID 0 for an initially transmitted TB1.

After receiving the first PDCCH, the UE starts the drx-InactivityTimer at time T31.

In step 2005, the network side device sends the initially transmitted TB1 (PDSCH).

In step 2006, after completing the reception of the initially transmitted TB1, the UE starts the discontinuous reception downlink retransmission timer corresponding to HARQ ID 0.

The UE receives the PDSCH on the resource indicated by the PDCCH, and after completing the reception of PDSCH, the UE starts the discontinuous reception downlink retransmission timer corresponding to HARQ ID 0. After completing the reception of the initially transmitted TB1, the UE starts the drx-RetransmissionTimerDL at the time T41.

In step 2007, when the decoding for the initial transmission of TB1 fails, the UE continues running the discontinuous reception downlink retransmission timer corresponding to HARQ ID 0.

Exemplarily, when TB1 is successfully decoded, the terminal stops the discontinuous reception downlink retransmission timer; when decoding of TB1 fails, the terminal continues to run the discontinuous reception downlink retransmission timer (until the timer expires or a retransmission scheduling of the downlink data is received). The drx-onDurationTimer expires and stops at the time T22.

In step 2008, the network side device sends a second PDCCH, where the second PDCCH is used to indicate to retransmit TB1.

In step 2009, the UE receives the second PDCCH, where the second PDCCH is used to indicate to retransmit TB1, and continues running the discontinuous reception downlink retransmission timer corresponding to HARQ ID 0.

The drx-InactivityTimer expires and stops at the time T32.

In step 2010, the network side device sends the retransmitted TB1 (PDSCH).

In step 2011, after completing the reception of the retransmitted TB1, the UE continues running the discontinuous reception downlink retransmission timer corresponding to HARQ ID 0.

In step 2012, when the decoding for the retransmission of TB1 is successful, the UE stops the discontinuous reception downlink retransmission timer corresponding to HARQ ID 0.

Exemplarily, when TB1 is successfully decoded, the terminal stops the discontinuous reception downlink retransmission timer; when decoding of TB1 fails, the terminal continues to run the discontinuous reception downlink retransmission timer (until the timer expires or a retransmission scheduling of the downlink data is received). After the decoding of the retransmitted TB1 is successful, the UE stops the drx-RetransmissionTimerDL at the time T45. Thereafter, the network side device schedules the second retransmission of TB2. Since the drx-onDurationTimer, the drx-InactivityTimer and the drx-RetransmissionTimerDL are all not running at this time, the UE is in the DRX dormant state, and the UE does not detect the PDCCH indicating the second retransmission scheduling of TB2, and does not receive the corresponding PDSCH. At the time T12 when the first DRX cycle ends and the second DRX cycle begins, the UE starts the drx-onDurationTimer.

In step 2013, the network side device sends a third PDCCH, where the third PDCCH is used to indicate to use HARQ ID 0 for the initially transmitted TB2.

In step 2014, the UE receives the third PDCCH, where the third PDCCH is used to indicate to use HARQ ID 0 for the initially transmitted TB2.

After receiving the third PDCCH, the UE starts the drx-InactivityTimer at the time T33.

In step 2015, the network side device sends the initially transmitted TB2 (PDSCH).

In step 2016, after completing the reception of the initially transmitted TB2, the UE starts the discontinuous reception downlink retransmission timer corresponding to HARQ ID 0.

The UE receives the PDSCH on the resource indicated by the PDCCH, and after completing the reception of PDSCH, the UE starts the discontinuous reception downlink retransmission timer corresponding to HARQ ID 0. After completing the reception of the initially transmitted TB2, the UE starts the drx-RetransmissionTimerDL at the time T46. The drx-onDurationTimer expires and stops at the time T24.

In step 2017, when the decoding for the initial transmission of TB2 fails, the UE continues running the discontinuous reception downlink retransmission timer corresponding to HARQ ID 0 until the discontinuous reception downlink retransmission timer expires.

Exemplarily, when TB2 is successfully decoded, the terminal stops the discontinuous reception downlink retransmission timer; when decoding of TB2 fails, the terminal continues to run the discontinuous reception downlink retransmission timer (until the timer expires or a retransmission scheduling of the downlink data is received). The drx-InactivityTimer expires and stops at the time T34. The drx-RetransmissionTimerDL expires and stops at the time T47. The second DRX cycle ends at the time T13.

FIG. 21 schematically illustrates a transmission process in which dynamic scheduling is used and a discontinuous reception downlink retransmission timer corresponding to a HARQ process used for downlink data is started or restarted only for initial transmission of the downlink data. As shown in FIG. 21, time-frequency diagrams of four downlink data transmissions are shown, and the four downlink data transmissions include: a first transmission, an initial transmission of TB1; a second transmission, a retransmission of TB1; a third transmission, a second retransmission of TB1; and a fourth transmission, an initial transmission of TB2. The network side device (sender) first transmits the PDCCH to the terminal for each transmission, the PDCCH carries the DCI, and the DCI is used to schedule the physical downlink shared channel (PDSCH) that carries the downlink data. After receiving the PDCCH, the terminal receives the downlink data carried in the PDSCH according to the scheduling of the DCI. In the third transmission, that is, the second retransmission of TB1, since the terminal is not in a monitoring state, the terminal does not receive the PDCCH and does not receive the PDSCH although the network side device has sent the PDCCH and PDSCH.

In FIG. 21, it is assumed that T11 is a start time of the first DRX cycle; T12 is an end time of the first DRX cycle and a start time of the second DRX cycle; T13 is an end time of the second DRX cycle; T22 is a time when a first drx-onDurationTimer expires and stops; T24 is a time when a second drx-onDurationTimer expires and stops; T31 is a time when the UE receives the scheduling information of the initially transmitted TB1; T32 is a time when a first drx-InactivityTimer expires and stops; T33 is a time when the UE receives the scheduling information of the initially transmitted TB2; T34 is a time when a second drx-InactivityTimer expires and stops; T41 is a time when the reception of the initially transmitted TB1 is completed; T45 is a time when the decoding of the retransmitted TB1 is successful; T46 is a time when the reception of the initially transmitted TB2 is completed; and T47 is a time when a third drx-RetransmissionTimerDL expires and stops.

In summary, in the method for data transmission provided by the embodiments of the present disclosure, when the downlink data is dynamically scheduled, when the discontinuous reception HARQ feedback is in the disabled state, the discontinuous reception of data is realized by starting or restarting the discontinuous reception downlink retransmission timer corresponding to the HARQ process used for the downlink data only for the initial transmission of the downlink data, which can reduce the operating time of the UE, and improve the probability of discontinuous reception.

In the fourth exemplary embodiment, the downlink data is semi-persistently scheduled, and the discontinuous reception downlink retransmission timer corresponding to the HARQ process used for the downlink data is started or restarted only for the initial transmission of the downlink data.

Figure 22:
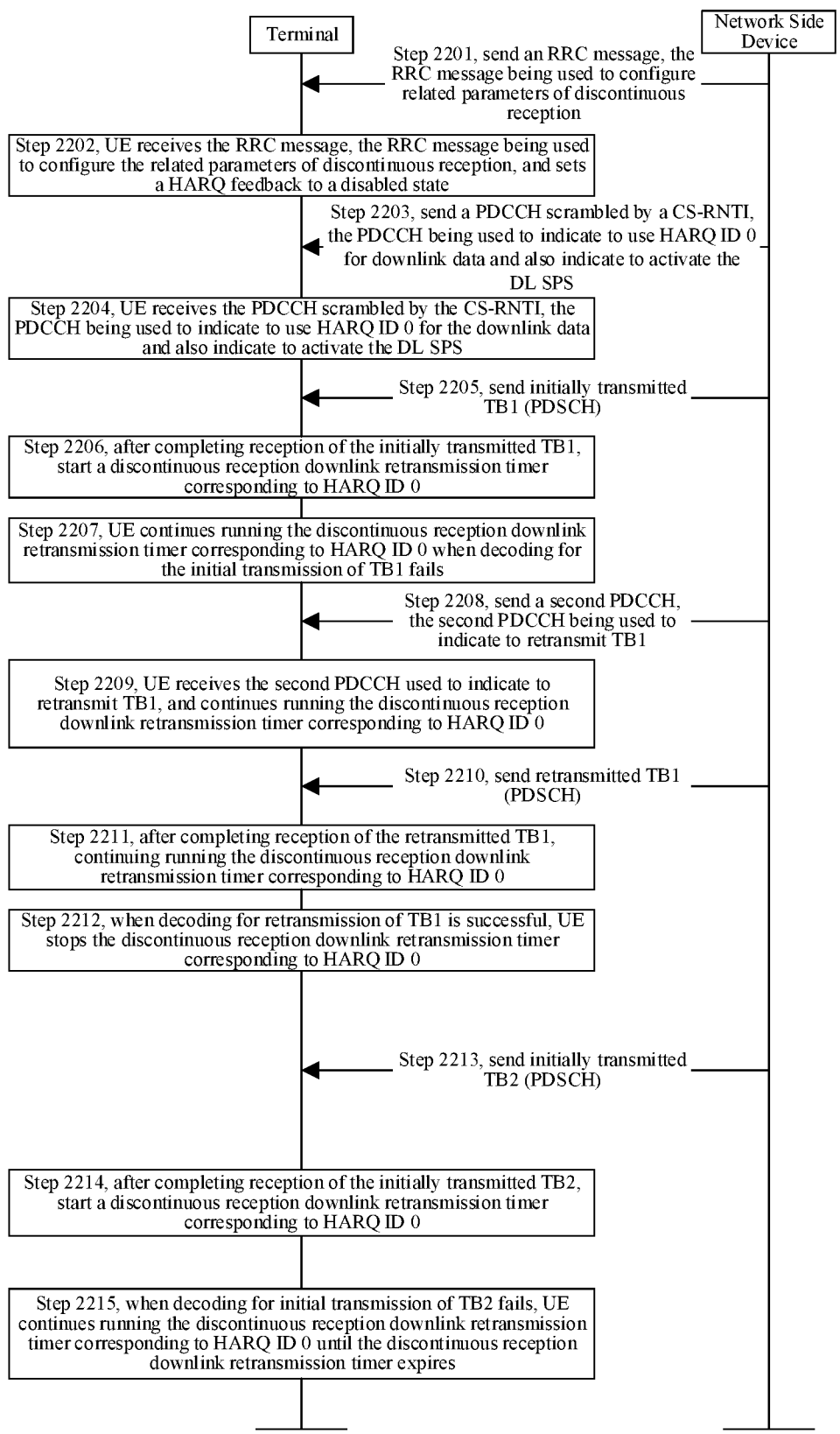
FIG. 22 is a flowchart of a method for data transmission provided by an exemplary embodiment of the present disclosure.
Figure 23:
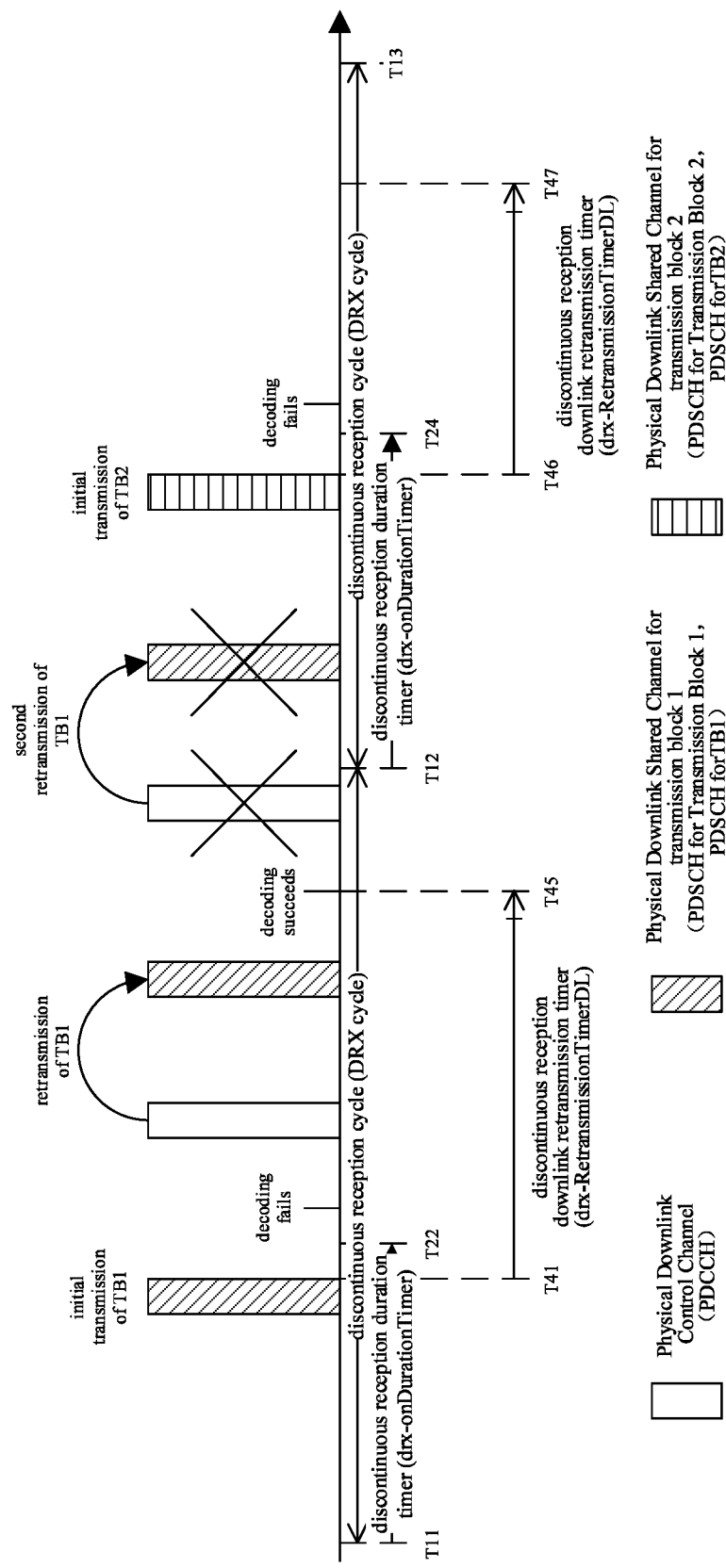
FIG. 23 is a time-frequency schematic diagram of a method for data transmission provided by an exemplary embodiment of the present disclosure when being implemented.

Referring to FIGS. 22 and 23, FIG. 22 is a flowchart of a method for data transmission provided by an exemplary embodiment of the present disclosure, and FIG. 23 is a time-frequency schematic diagram of the method for data transmission provided by the embodiment shown in FIG. 22 when being implemented. The method includes at least the following steps.

In step 2201, the network side device sends an RRC message, where the RRC message is used to configure related parameters of discontinuous reception.

The related parameters of discontinuous reception include: the DRX cycle, the drx-onDurationTimer, the drx-InactivityTimer, the drx-RetransmissionTimerDL, etc. Each serving cell of the UE is configured with at least one DL BWP, and the DL BWP is configured with DL SPS. Downlink SPS configuration parameters include: CS-RNTI, the number of HARQ processes reserved for SPS, the SPS cycle, etc.

In step 2202, the UE receives the RRC message, the RRC message being used to configure the related parameters of discontinuous reception, and sets the HARQ feedback to the disabled state.

At the time T11 when a first DRX cycle begins, the UE starts the drx-onDurationTimer.

In step 2203, the network side device sends the PDCCH scrambled by the CS-RNTI, where the PDCCH is used to indicate to use HARQ ID 0 for the downlink data and also indicate to activate the DL SPS.

In step 2204, the UE receives the PDCCH scrambled by the CS-RNTI, where the PDCCH is used to indicate to use HARQ ID 0 for the downlink data, and also indicate to activate the DL SPS.

In step 2205, the network side device sends the initially transmitted TB1.

In step 2206, after completing the reception of the initially transmitted TB1, the UE starts the discontinuous reception downlink retransmission timer corresponding to HARQ ID 0.

The UE receives the PDSCH on the resource indicated by the PDCCH, and after completing the reception of the PDSCH, the UE starts the discontinuous reception downlink retransmission timer corresponding to HARQ ID 0. After completing the reception of the initially transmitted TB1, the UE starts the drx-RetransmissionTimerDL at the time T41.

In step 2207, when the decoding for the initial transmission of TB1 fails, the UE continues running the discontinuous reception downlink retransmission timer corresponding to HARQ ID 0.

Exemplarily, when TB1 is successfully decoded, the terminal stops the discontinuous reception downlink retransmission timer; when decoding of TB1 fails, the terminal continues to run the discontinuous reception downlink retransmission timer (until the timer expires or a retransmission scheduling of the downlink data is received). The drx-onDurationTimer expires and stops at the time T22.

In step 2208, the network side device sends a second PDCCH.

In step 2209, the UE receives the second PDCCH, where the second PDCCH is used to indicate to retransmit TB1, and continues running the discontinuous reception downlink retransmission timer corresponding to HARQ ID 0.

In step 2210, the network side device sends the retransmitted TB1.

In step 2211, after completing the reception of the retransmitted TB1, the UE continues running the discontinuous reception downlink retransmission timer corresponding to HARQ ID 0.

In step 2212, when the decoding for the retransmission of TB1 is successful, the UE stops the discontinuous reception downlink retransmission timer corresponding to HARQ ID 0.

Exemplarily, when TB1 is successfully decoded, the terminal stops the discontinuous reception downlink retransmission timer; when the decoding TB1 fails, the terminal continues to run the discontinuous reception downlink retransmission timer (until the timer expires or a retransmission scheduling of the downlink data is received). After the decoding for the retransmission of TB1 is successful, the UE stops the drx-RetransmissionTimerDL at the time T45. Thereafter, the network side device schedules the second retransmission of TB2. Since the drx-onDurationTimer, the drx-InactivityTimer and the drx-RetransmissionTimerDL are all not running at this time, the UE is in the DRX dormant state, and the UE does not monitor the PDCCH indicating the second retransmission scheduling of TB2, and does not receive the corresponding PDSCH. At the time T12 when the first DRX cycle ends and the second DRX cycle begins, the UE starts the drx-onDurationTimer.

In step 2213, the network side device sends the initially transmitted TB2.

In step 2214, after completing the reception of the initially transmitted TB2, the UE starts the discontinuous reception downlink retransmission timer corresponding to HARQ ID 0.

The UE receives the PDSCH on the resource indicated by the PDCCH, and after completing the reception of PDSCH, the UE starts the discontinuous reception downlink retransmission timer corresponding to HARQ ID 0. After completing the reception of the initially transmitted TB2, the UE starts the drx-RetransmissionTimerDL at the time T46. The drx-onDurationTimer expires and stops at the time T24.

In step 2215, when the decoding for the initial transmission of TB2 fails, the UE continues running the discontinuous reception downlink retransmission timer corresponding to HARQ ID 0 until the discontinuous reception downlink retransmission timer expires.

Exemplarily, when TB2 is successfully decoded, the terminal stops the discontinuous reception downlink retransmission timer; when the decoding of TB2 fails, the terminal continues to run the discontinuous reception downlink retransmission timer (until the timer expires or a retransmission scheduling of the downlink data is received). The drx-RetransmissionTimerDL expires and stops at the time T47. The second DRX cycle ends at the time T13.

FIG. 23 schematically illustrates a transmission process in which semi-persistent scheduling is used and a discontinuous reception downlink retransmission timer corresponding to a HARQ process used for downlink data is started or restarted for each downlink data transmission. As shown in FIG. 23, time-frequency diagrams of four downlink data transmissions are shown, and the four downlink data transmissions include: a first transmission, an initial transmission of TB1; a second transmission, a retransmission of TB1; a third transmission, a second retransmission of TB1; and a fourth transmission, an initial transmission of TB2. For the first transmission and the fourth transmission, the terminal receives the downlink data carried in the PDSCH according to the scheduling of the DCI. For the second transmission and the third transmission, the network side device (sender) first transmits the PDCCH to the terminal, the PDCCH carries the DCI, and the DCI is used to schedule the physical downlink shared channel (PDSCH) that carries the downlink data. After receiving the PDCCH, the terminal receives the downlink data carried in the PDSCH according to the scheduling of the DCI. In the third transmission, that is, the second retransmission of TB1, since the terminal is not in a monitoring state, the terminal does not receive the PDCCH and does not receive the PDSCH although the network side device has sent the PDCCH and PDSCH.

In FIG. 23, it is assumed that T11 is a start time of the first DRX cycle; T12 is an end time of the first DRX cycle and a start time of the second DRX cycle; T13 is an end time of the second DRX cycle; T22 is a time when a first drx-onDurationTimer expires and stops; T24 is a time when a second drx-onDurationTimer expires and stops; T41 is a time when the reception of the initially transmitted TB1 is completed; T45 is a time when the decoding of the retransmitted TB1 is successful; T46 is a time when the reception of the initially transmitted TB2 is completed; and T47 is a time when a third drx-RetransmissionTimerDL expires and stops.

In summary, in the method for data transmission provided by the embodiments of the present disclosure, when the downlink data is semi-persistently scheduled, when the discontinuous reception HARQ feedback is in the disabled state, the discontinuous reception of data is realized by starting or restarting the discontinuous reception downlink retransmission timer corresponding to the HARQ process used for the downlink data for each downlink data transmission, which can reduce the operating time of the UE, and improve the probability of discontinuous reception.

Figure 24:
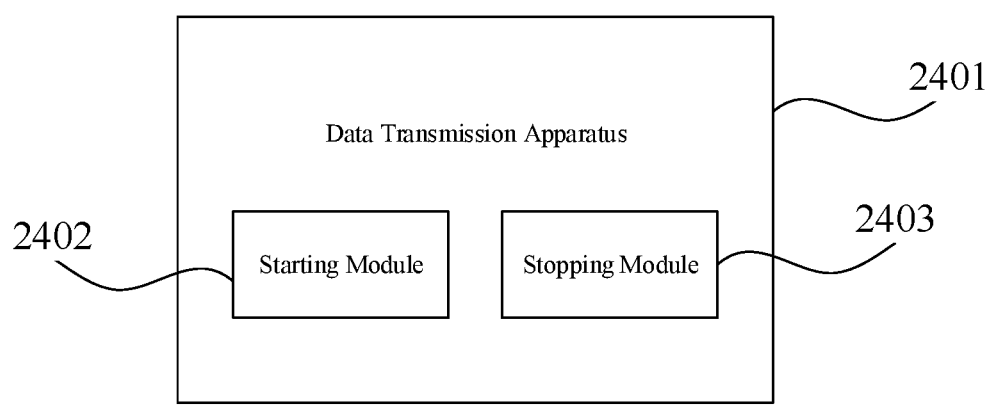
FIG. 24 is a block diagram of an apparatus for data transmission provided by an embodiment of the present disclosure.
Figure 25:
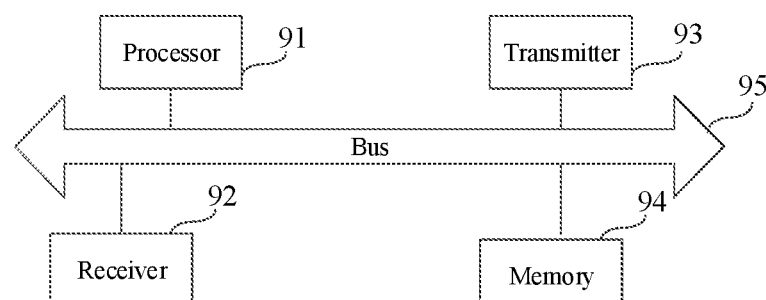
FIG. 25 is a structural block diagram of a terminal provided by an embodiment of the present disclosure.

FIG. 24 shows a block diagram of an apparatus for data transmission provided by an embodiment of the present disclosure. The apparatus 2401 includes:

a starting module 2402, configured to start or restart a discontinuous reception downlink retransmission timer in a downlink reception process when a discontinuous reception HARQ feedback is in a disabled state.

In an embodiment, the starting module 2402 is configured to start or restart the discontinuous reception downlink retransmission timer corresponding to a HARQ process used for downlink data at a first symbol after the downlink data is received.

In an embodiment, a repeated transmission mode is used for the downlink data; and the starting module 2402 is configured to start or restart the discontinuous reception downlink retransmission timer corresponding to the HARQ process used for the downlink data at the first symbol after a first repeated transmission of the downlink data is received.

In an embodiment, a repeated transmission mode is used for the downlink data; and the starting module 2402 is configured to start or restart the discontinuous reception downlink retransmission timer corresponding to the HARQ process used for the downlink data at the first symbol after the last repeated transmission of the downlink data is received.

In an embodiment, a repeated transmission mode is used for the downlink data; the apparatus 2401 further includes: a stopping module 2403;

the stopping module 2403 is configured to stop the discontinuous reception downlink retransmission timer corresponding to the HARQ process used for the downlink data at the first symbol after a first repeated transmission of the downlink data is received; and the starting module 2402 is configured to start the discontinuous reception downlink retransmission timer corresponding to the HARQ process used for the downlink data at the first symbol after the last repeated transmission of the downlink data is received.

In an embodiment, a scheduling mode of dynamic scheduling is used for the downlink data; the apparatus 2401 further comprises: a stopping module 2403; and the stopping module 2403 is configured to stop the discontinuous reception downlink retransmission timer corresponding to the HARQ process used for the downlink data at a time when scheduling information of the downlink data is received.

In an embodiment, a scheduling mode of dynamic scheduling is used for the downlink data; and the starting module 2402 is configured to start or restart the discontinuous reception downlink retransmission timer corresponding to the HARQ process used for the downlink data at a time when scheduling information of the downlink data is received.

In an embodiment, a scheduling mode of semi-persistent scheduling is used for the downlink data.

In an embodiment, the downlink data includes:
both initially transmitted downlink data and retransmitted downlink data;
or,
the initially transmitted downlink data.

In an embodiment, the starting module 2402 is further configured to not start a discontinuous reception downlink HARQ round trip time timer when the discontinuous reception HARQ feedback is in the disabled state.

In an embodiment, the apparatus 2401 further includes: a stopping module 2403; and the stopping module is configured to stop the discontinuous reception downlink retransmission timer when the downlink data is successfully decoded.

The present disclosure provides a terminal. Referring to FIG. 22, FIG. 22 shows a structural block diagram of a terminal provided by an exemplary embodiment of the present disclosure. The terminal includes: a processor 91, a receiver 92, a transmitter 93, a memory 94, and a bus 95.

The processor 91 includes one or more processing cores. The processor 91 executes various functional applications and information processing by running software programs and modules.

The receiver 92 and the transmitter 93 may be implemented as one communication component, which communication component may be a communication chip. The communication chip may include a receiving module, a transmission module, a modem module and so on, and is configured to modulate and/or demodulate information and receive or send the information through a wireless signal.

The memory 94 is connected to the processor 91 through the bus 95.

The memory 94 may be configured to store at least one instruction. The processor 91 is configured to execute the at least one instruction, so as to implement steps in the foregoing method embodiments.

In addition, the memory 94 can be implemented by any type of volatile or non-volatile storage device or a combination thereof, for example, a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic disk, or an optical disk.

The present disclosure provides a computer-readable storage medium in which at least one instruction is stored. The at least one instruction is loaded and executed by the processor to implement the method for data transmission provided by the foregoing various method embodiments.

The present disclosure also provides a computer program product which, when running on a computer, causes the computer to execute the method for data transmission provided by the foregoing various method embodiments.

Those of ordinary skill in the art should understand that all or part of the steps in the foregoing embodiments may be completed through hardware, or may be completed through the hardware instructed by a program. The program may be stored in a computer-readable storage medium, and the storage medium may be a read-only memory, a magnetic disk, an optical disk or the like.

Those described above are only embodiments of the present disclosure and are not intended to limit the present disclosure. Any modification, equivalent replacement, improvement and the like made within the spirit and principle of the present disclosure shall be included in the protection scope of the present disclosure.

What is claimed is:

1. A method for data transmission, comprising:
starting or restarting a discontinuous reception downlink retransmission timer in a downlink reception process when a discontinuous reception HARQ feedback is in a disabled state,
wherein the starting or restarting the discontinuous reception downlink retransmission timer in the downlink reception process comprises:
starting or restarting the discontinuous reception downlink retransmission timer corresponding to a HARQ process used for downlink data at a first symbol after the downlink data is received,
wherein a repeated transmission mode is used for the downlink data, and the starting or restarting the discontinuous reception downlink retransmission timer corresponding to the HARQ process used for the downlink data at the first symbol after the downlink data is received comprises:
stopping the discontinuous reception downlink retransmission timer corresponding to the HARQ process used for the downlink data at the first symbol after a first repeated transmission of the downlink data is received; and
starting the discontinuous reception downlink retransmission timer corresponding to the HARQ process used for the downlink data at the first symbol after the last repeated transmission of the downlink data is received.

2. The method according to claim 1, wherein a scheduling mode of semi-persistent scheduling is used for the downlink data.

3. The method according to claim 1, wherein the downlink data comprises:
both initially transmitted downlink data and retransmitted downlink data; or,
the initially transmitted downlink data.

4. The method according to claim 1, wherein the method further comprises:
not starting a discontinuous reception downlink HARQ round trip time timer when the discontinuous reception HARQ feedback is in the disabled state.

5. An apparatus for data transmission, comprising:
a transceiver;
a processor; and
a memory configured to store a computer program executable by the processor,
wherein the processor is configured to start or restart a discontinuous reception downlink retransmission timer in a downlink reception process when a discontinuous reception HARQ feedback is in a disabled state,
wherein the processor is configured to start or restart the discontinuous reception downlink retransmission timer corresponding to a HARQ process used for downlink data at a first symbol after the downlink data is received,
wherein a repeated transmission mode is used for the downlink data, and the processor is configured to:
stop the discontinuous reception downlink retransmission timer corresponding to the HARQ process used for the downlink data at the first symbol after a first repeated transmission of the downlink data is received; and
start the discontinuous reception downlink retransmission timer corresponding to the HARQ process used for the downlink data at the first symbol after the last repeated transmission of the downlink data is received.

6. The apparatus according to claim 5, wherein a scheduling mode of semi-persistent scheduling is used for the downlink data.

7. The apparatus according to claim 5, wherein the downlink data comprises:
both initially transmitted downlink data and retransmitted downlink data; or,
the initially transmitted downlink data.

8. The apparatus according to claim 5, wherein:
the processor is further configured to not start a discontinuous reception downlink HARQ round trip time timer when the discontinuous reception HARQ feedback is in the disabled state.

* * * * *